(12) United States Patent
Nagaoka et al.

(10) Patent No.: US 8,306,263 B2
(45) Date of Patent: Nov. 6, 2012

(54) OBJECT TYPE DETERMINATION APPARATUS, VEHICLE, OBJECT TYPE DETERMINATION METHOD, AND PROGRAM FOR DETERMINING OBJECT TYPE

(75) Inventors: Nobuharu Nagaoka, Wako (JP); Makoto Aimura, Wako (JP); Takayuki Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1144 days.

(21) Appl. No.: 12/218,517

(22) Filed: Jul. 16, 2008

(65) Prior Publication Data

US 2009/0041302 A1    Feb. 12, 2009

(30) Foreign Application Priority Data

Aug. 7, 2007   (JP) ................. 2007-205938

(51) Int. Cl.
*G06K 9/00* (2006.01)
(52) U.S. Cl. ...................................... 382/103
(58) Field of Classification Search .......... 340/907–911, 340/933–937; 348/113, 154–156, 169–172; 382/100–107
See application file for complete search history.

(56) References Cited

U.S. PATENT DOCUMENTS

| 2003/0137593 | A1* | 7/2003 | Watanabe et al. ............. 348/274 |
| 2004/0228503 | A1 | 11/2004 | Cutler |

FOREIGN PATENT DOCUMENTS

| JP | 07-050825 | 2/1995 |
| JP | 2001-006096 | 1/2001 |
| JP | 2001-028050 | 1/2001 |

OTHER PUBLICATIONS

Machine Translation: JPN 07-050825.*

(Continued)

*Primary Examiner* — Atiba O Fitzpatrick
(74) *Attorney, Agent, or Firm* — Carrier Blackman & Associates, P.C.; Joseph P. Carrier; William D. Blackman

(57) ABSTRACT

An object type determination apparatus, an object type determination method, a vehicle, and a program for determining an object type, capable of accurately determining the type of the object by appropriately determining periodicity in movement of the object from images, are provided. The object type determination apparatus includes an object area extracting means (11) for extracting an area of an object from an image picked up by an image pick-up means (2R, 2L), an object end point extracting means (12) for extracting an end point of an image portion of the object from the extracted object area, an object periodicity determination means (13) for calculating time series data of a feature value representing a size of the object using the end point of the image portion of the object extracted by the object end point extracting means (12) from the area of the object extracted by the object area extracting means (11) for respective ones of time series images picked up by the image pick-up means (2R, 2L) to determine whether the feature value changes with prescribed periodicity, and a living body determination means (14) for determining the object having the feature value determined to change with periodicity as a living body.

18 Claims, 20 Drawing Sheets

OTHER PUBLICATIONS

Yasutomi S et al.: "A Method for Discriminating of Pedestrian Based on Rhythm", Intelligent Robots and Systems '94., 'Advanced Robotic Systems and the Real World', Iros '94., Proceedings of the IEEE/RSJ/GI International Conference in Munich, Germany Sep. 12-16, 1994, New York, NY, USA, IEEE, vol. 2, Sep. 12, 1994, pp. 988-995, XP010141903; ISBN: 978-0-7803-1933-2 sections 2 Detection of Moving Object; 4.1 Detection of Rhythm; 4.2 Model Matching; 5 Experimental Result; 6 Conclusion *abstract; figure 4 *.

Collins R T et al: "Silhouette-based Human Identification from Body Shape and Gait"; Automatic Face and Gesture Recognition, 2002. Proceedings. Fifth IEEE International Conference on, IEEE, Piscataway, NJ, USA, May 20, 2002, pp. 366-371, XP010949384; ISBN: 978-0-7695-1602-8, *abstract; figure 2 , p. 367, left-hand column, last paragraph *.

Cuntoor N et al: "Combining multiple evidences for gait recognition", 2003 IEEE International Conference on Acoustics, Speech, and Signal Processing. Proceedings. (ICASSP). Hong Kong, Apr. 6-10, 2003 [IEEE International Conference on Acoustics, Speech, and Signal Processing (ICASSP)], New York, NY: IEEE, US, vol. 3, Apr. 6, 2003, pp. III_33-III_36, XP010639002, ISBN: 978-0-7803-7663-2, * abstract *.

* cited by examiner

IMAGE PICK-UP TIME $t_{10}$

AFTER dT (sec)

IMAGE PICK-UP TIME $t_{11}$

OBJECT TYPE DETERMINATION APPARATUS, VEHICLE, OBJECT TYPE DETERMINATION METHOD, AND PROGRAM FOR DETERMINING OBJECT TYPE

BACKGROUND OF THE INVENTION

1. Field of the Invention

The present invention relates to an apparatus and method for detecting an object such as a pedestrian from an image obtained via an image pick-up means such as a camera, a vehicle mounted with the apparatus, and a program for causing a computer to carry out the processing of the apparatus.

2. Description of the Related Art

Recently, there is known a technique of detecting an object such as a pedestrian existing around a vehicle from an image picked up by an image pick-up means such as a CCD camera mounted on the vehicle to determine an object whose contact with the vehicle should be avoided and providing such information to the driver of the vehicle (see, for example, Japanese Patent Application Laid-Open No. 2001-006096 (Patent Document 1)).

In the vehicle surroundings monitoring apparatus disclosed in Patent Document 1, the images of the surroundings of the vehicle obtained by two infrared cameras are subjected to binarization processing to extract an object, and a relative position or relative speed of the object and the vehicle is detected, to thereby determine the possibility of contact of the object with the vehicle as well as the type of the object. The apparatus of Patent Document 1 determines the type of the object (pedestrian, other vehicle, man-made structure or the like) in the case where there is an object in an approach determination area in front of the vehicle (which area is determined according to the relative speed of the object to the vehicle, the width of the vehicle, or the like). In determination of the type of the object, a characteristic of the shape pattern of the image portion of the object in the image picked up at a prescribed time is used. If it is determined that the object is a pedestrian, the object is determined to be an object whose contact with the vehicle should be avoided.

In the case of a moving object, such as a pedestrian, animal or the like, the shape pattern of its image portion would change in various manners over time, making it difficult to expect all the shape patterns in advance. Thus, in the case of determining the type of the object using the shape pattern of the image portion, it will be difficult to detect a pedestrian or the like if its image portion is in an unexpected shape pattern.

Generally, the movements of the pedestrian, animal and the like each have a prescribed rhythm. Taking this into consideration, there is proposed an apparatus which determines the type of the object by detecting the pattern of movement of the object through processing of time series images (see, for example, Japanese Patent Application Laid-Open No. 7-050825 (Patent Document 2)).

In the human being and animal monitoring system disclosed in Patent Document 2, an infrared image picked up by an infrared camera is subjected to binarization processing to extract an image portion of the object (object image). Then, periodicity in change of areas of the portions corresponding to left and right legs within the object image is examined to determine whether the object is a human being or an animal.

For example in the case of extracting the object image through binarization of an infrared image, however, the area may not be obtained in a stable manner due to the influence of the surrounding environment. Specifically, in the case of binarization using a prescribed threshold value, a part of the leg may not be extracted as an area of high luminance, depending on the outdoor air temperature. In such a case, the determination of the type of the object using the change amount of the area of the leg portion alone, as in Patent Document 2, may lead to an erroneous determination.

SUMMARY OF THE INVENTION

The present invention has been made in view of the foregoing, and an object of the present invention is to provide an object type determination apparatus, a vehicle, and an object type determination method capable of accurately determining a type of an object by appropriately determining periodicity in movement of the object from images, and a program for determining a type of an object which causes a computer to carry out the processing of the object type determination apparatus.

In order to achieve the above objects, an object type determination apparatus according to the present invention is for determining a type of an object the image of which is picked up by an image pick-up means, and includes: an object area extracting means for extracting an area of an object from an image picked up by the image pick-up means; an object end point extracting means for extracting an end point of an image portion of the object from the area of the object extracted by the object area extracting means; an object periodicity determination means for calculating time series data of a feature value representing a size of the image portion of the object using the end point of the image portion of the object extracted by the object end point extracting means from the area of the object extracted by the object area extracting means for respective ones of time series images picked up by the image pick-up means, to determine whether the feature value changes with prescribed periodicity; and a living body determination means for determining the object having the feature value which is determined to change with periodicity by the object periodicity determination means as a living body (first invention).

In the object type determination apparatus of the first invention, the object area extracting means sequentially extracts an area of the object from each of the images picked up by the image pick-up means. Here, the object is the one that may be a living body such as a pedestrian, bicycle rider, or animal.

The object end point extracting means then sequentially extracts an end point of the image portion of the object from each of the object areas extracted by the object area extracting means. The end point of the image portion of the object, which distinguishably shows the position and/or size of the image portion of the object, is extracted by edge extracting processing, for example. Extracting the end point of the image portion of the object by further processing the area of the object as described above ensures stable extraction of the feature value representing the size of the image portion of the object.

Further, the object periodicity determination means calculates time series data of the feature value representing the size of the image portion of the object, using the end point of the image portion of the object extracted by the object end point extracting means from the area of the object extracted by the object area extracting means for a respective one of the time series images picked up by the image pick-up means. In the case where the object is a pedestrian or an animal, the feature value representing the size of the image portion of the object (the feature value representing the spatial volume of the object) may be the width or height of the entire body of the pedestrian or the animal, the width of the legs, the position of the height of the arm or foot, the difference in position of the heights of the left and right arms or feet, or the like.

With the end point indicating the position and/or size of the image portion of the object being extracted, the pattern of movement of the object is grasped from the time series data of the feature value calculated using the end point. In the case where the object is a living body such as a pedestrian, the pattern of movement of the object generally shows certain periodicity. Thus, the object periodicity determination means determines whether the feature value changes with certain periodicity to thereby grasp the periodicity in the movement pattern of the object. For the object having the feature value determined to change with periodicity by the object periodicity determination means, the living body determination means determines it to be a living body (for example, the living body that moves such as a pedestrian, bicycle rider, animal or the like), ensuring accurate determination as to whether the object is a living body.

As described above, according to the present invention, it is possible to accurately determine the type of the object by appropriately determining the periodicity in movement of the object from the images.

In the object type determination apparatus of the first invention, the object periodicity determination means preferably uses a width of the image portion of the object in a lower part area in the area of the object as the feature value representing the size of the image portion of the object (second invention).

Specifically, in the case where the object is a pedestrian or the like, the legs would move periodically during the walking motion. When the images of the pedestrian or the like are picked up from the lateral direction, the width of the legs would change periodically. Therefore, it is possible to accurately determine that the object is a living body by using the width of the image portion of the object in the lower part area (where the images of the legs may be picked up when the object is a pedestrian or the like) in the object area as the feature value to determine whether the feature value has certain periodicity and by determining the object having the feature value which is determined to change with periodicity as a living body.

Further, in the object type determination apparatus of the first or second invention, the object periodicity determination means preferably uses a height of the image portion of the object as the feature value representing the size of the image portion of the object (third invention).

Specifically, in the case where the object is a pedestrian or the like, the position of the head would change periodically in the vertical direction during the walking motion. Therefore, it is possible to accurately determine that the object is a living body by using the height of the image portion of the object as the feature value to determine whether the feature value has certain periodicity and by determining the object having the feature value which is determined to change with periodicity as a living body.

Further, in the object type determination apparatus of any of the first through third inventions, it is preferable that the apparatus includes a first specific site extracting means for extracting an image portion of a specific site of the object from the area of the object extracted by the object area extracting means, wherein the object end point extracting means extracts an end point of the image portion of the specific site extracted by the first specific site extracting means, and the object periodicity determination means uses a height of the image portion of the specific site as the feature value representing the size of the image portion of the object (fourth invention).

Specifically, in the case where the object is a pedestrian or the like, the position of the arm or foot would change periodically in the vertical direction during the walking motion. Thus, the first specific site extracting means extracts an image portion of the site corresponding to the arm or foot in the case where the object is assumed to be a pedestrian, for example, from the area of the object extracted by the object area extracting means, as the image portion of the specific site of the object. Then, the object periodicity determination means uses a height of the image portion of the object calculated from the end point of the image portion of the specific site as the feature value to determine whether the feature value shows certain periodicity. The object determined to show a periodic change is then determined to be a living body, which ensures accurate determination of the object being a living body.

Further, in the object type determination apparatus of any of the first through fourth inventions, it is preferable that the apparatus includes a second specific site extracting means for extracting image portions of a pair of specific sites of the object from the area of the object extracted by the object area extracting means, wherein the object end point extracting means extracts end points of the image portions of the pair of specific sites extracted by the second specific site extracting means, and the object periodicity determination means uses a difference in height of the image portions of the pair of specific sites as the feature value representing the size of the object (fifth invention).

Specifically, in the case where the object is a pedestrian or the like, the positions of the arms or feet in the height direction would change alternately and periodically during the walking motion. Thus, the second specific site extracting means extracts image portions of the sites corresponding to the arms or feet in the case where the object is assumed to be a pedestrian, for example, from the area of the object extracted by the object area extracting means, as the image portions of the pair of specific sites of the object. Then, the object periodicity determination means uses a difference in height of the pair of specific sites of the object calculated from the end points of the pair of specific sites as the feature value, to determine whether the feature value shows certain periodicity. The object determined to show a periodic change is then determined to be a living body, ensuring accurate determination of the object being a living body.

Further, in the object type determination apparatus of the first invention, it is preferable that the object periodicity determination means has a plurality of determination conditions for determining whether the feature value representing the size of the image portion of the object changes with prescribed periodicity based on the time series data of the feature value, and in the case where a result of the determination according to at least a predetermined number of determination conditions among the plurality of determination conditions indicates that the feature value changes with prescribed periodicity, the object periodicity determination means determines that the feature value has prescribed periodicity (sixth invention).

The periodicity inherent in the pattern of movement or the feature value showing periodicity would vary depending on the situations of the object, such as whether the object is a pedestrian or a bicycle rider, or whether the object is a pedestrian crossing the road or a pedestrian walking along the road. Further, a plurality of feature values may show different types of periodicity depending on the situations of the object.

In the present invention, the object periodicity determination means has a plurality of determination conditions, and uses the respective determination conditions to make determinations corresponding to various situations of the object. In the case where the determination result using at least a predetermined number of (for example, one) determination condition among the plurality of determination conditions indicates the presence of a periodic change, the object periodicity determination means determines that the feature value has periodicity. This enables determination as to whether the object has periodicity, irrespective of the situation of the object, ensuring more accurate determination of the object being a living body.

Further, in the object type determination apparatus of the sixth invention, it is preferable that the object periodicity determination means uses, as the determination conditions, at least one of: a determination condition having a width of an image portion of the object in a lower part area in the area of the object as the feature value, a determination condition having a height of the image portion of the object as the feature value, a determination condition having a height of an image portion of a specific site of the object as the feature value, and a determination condition having a difference in height of image portions of a pair of specific sites of the object as the feature value (seventh invention).

Specifically, in the case where the object is a pedestrian or the like, when the images of the pedestrian or the like are picked up from the lateral direction, the width of the image portion of the legs would change periodically. Thus, the periodicity in the pattern of movement of the object under such a situation is grasped by using the determination condition which has the width of the image portion of the object in the lower part area in the area of the object as the feature value. Further, in the case where the object is a pedestrian or the like, the position of the head would change periodically in the vertical direction. Thus, the periodicity in the pattern of movement of the object under such a situation is grasped by using the determination condition which has the height of the image portion of the object as the feature value.

Furthermore, in the case where the object is a pedestrian or the like, the position of the arm or foot would change periodically in the vertical direction. Thus, the periodicity in the pattern of movement of the object under such a situation is grasped by using the determination condition which has the height of the specific site (arm or foot) of the object as the feature value.

Still further, in the case where the object is a pedestrian or the like, the positions in the height direction of the arms or feet would change alternately and periodically. Thus, the periodicity in the pattern of movement of the object under such a situation is grasped by using the determination condition which has the difference in height of the pair of specific sites (arms or feet) of the object as the feature value. As such, using these determination conditions enables determinations corresponding to various situations of the object.

Further, in the object type determination apparatus of any of the first through seventh inventions, the object end point extracting means preferably extracts an end point of the image portion of the object by performing edge extracting processing on the area of the object extracted by the object area extracting means (eighth invention).

In this case, the end point of the image portion of the object is obtained stably and easily by the edge extracting processing, and the feature value representing the size of the object is obtained with accuracy from the end point. This enables appropriate determination on the periodicity by the object periodicity determination means, and thus, ensures accurate determination as to whether the object is a living body.

Alternatively, in the object type determination apparatus of any of the first through seventh inventions, the object area extracting means may set a plurality of mask areas in each of two images picked up at different times, and perform a correlation operation for a respective pair of the mask areas set in the corresponding positions in the two images to extract the area of the object, and the object end point extracting means may use positional information of the plurality of mask areas included in the area of the object extracted by the object area extracting means to extract an end point of the image portion of the object (ninth invention).

In this case, the area of the object is extracted with accuracy by the object area extracting means, reflecting the local degrees of correlation between the mask areas set in the corresponding positions in two images picked up at different times. Then, the object end point extracting means uses the positional information of the mask areas included in the area of the object to extract the end point of the image portion of the object. Accordingly, the feature value representing the size of the image portion of the object is obtained with accuracy from the extracted end point.

Further, in the object type determination apparatus of any of the first through ninth inventions, it is preferable that the object periodicity determination means uses an upper part area in an area of a first object extracted from one of two images picked up at different times as a template to extract an area of a second object having correlation with the first object from the other one of the two images by template matching to associate the objects in the different times with each other, to thereby calculate the time series data of the feature value representing the size of the image portion of the object (tenth invention).

Specifically, in the case where the object is a pedestrian or the like, the shape pattern of the upper body part would be relatively stable irrespective of time during the walking motion. Thus, for the two images picked up at different times, the object periodicity determination means uses an upper part area in the area of a first object extracted from one of the images as a template to extract a second object having correlation with the first object from the other image by template matching. This allows the image portions of the identical object picked up at different times to be appropriately associated with each other. Thus, by extracting the areas of the identical object at different times to determine periodicity, the movement of the object is grasped appropriately.

Further, in the object type determination apparatus of any of the first through tenth inventions, it is preferable that the object periodicity determination means determines whether a maximum change amount of a converted value of the feature value in a real space is within a predetermined range, and the living body determination means determines an object for which the object periodicity determination means determines that the feature value changes with periodicity and that the maximum change amount of the converted value of the feature value in the real space is within the predetermined range as a living body (eleventh invention).

In this case, in the case where the object is a living body such as a pedestrian, bicycle rider or animal, the predetermined range is determined in advance as a range of the value the converted value in the real space of the feature value representing the size of the image portion may take. The object periodicity determination means is capable of obtaining the converted value of the feature value in the real space, based on the feature value (in the image space) representing the size of the image portion of the object, by converting it into the value in the real space using, e.g., the distance of the object to the image pick-up means, a focal length of the image pick-up means, and pixel pitch of the image pick-up means. The object periodicity determination means then determines whether the maximum change amount of the converted value of the feature value in the real space falls within the predetermined range to determine whether the object is a living body, which ensures more appropriate determination of the living body.

Further, in the object type determination apparatus of any of the first through eleventh inventions, the image pick-up means is preferably an infrared camera (twelfth invention).

In this case, in the infrared image picked up by the infrared camera, the area corresponding to the object of high temperature is shown as an area of high luminance, and accordingly, it is possible to easily extract the area corresponding to the living body such as a pedestrian, which is a heat source, as the area of the object from the image.

A vehicle of the present invention is characterized in that the object type determination apparatus of any of the first through twelfth inventions is mounted thereon (thirteenth invention).

According to the vehicle of the thirteenth invention, it is possible to realize the vehicle which produces the effects comparable to those of the object type determination apparatus of the present invention.

An object type determination method of the present invention is for determining a type of an object the image of which is picked up by an image pick-up means, and includes: an object area extracting step of extracting an area of an object from an image picked up by the image pick-up means; an object end point extracting step of extracting an end point of an image portion of the object from the area of the object extracted in the object area extracting step; an object periodicity determining step of calculating time series data of a feature value representing a size of the image portion of the object using the end point of the image portion of the object extracted in the object end point extracting step from the area of the object extracted in the object area extracting step for respective ones of time series images picked up by the image pick-up means, to determine whether the feature value changes with prescribed periodicity; and a living body determining step of determining the object having the feature value which is determined to change with periodicity in the object periodicity determining step as a living body (fourteenth invention).

According to the object type determination method of the fourteenth invention, as described in conjunction with the object type determination apparatus of the first invention, the end point of the image portion of the object is extracted in the object end point extracting step by further processing the area of the object extracted in the object area extracting step, which ensures stable extraction of the end point of the image portion of the object. Then, in the object periodicity determining step, time series data of the feature value representing the size of the image portion of the object are calculated using the end point of the image portion of the object extracted for a respective one of the time series images picked up by the image pick-up means, to grasp the pattern of movement of the object from the time series data of the feature value. The object having the feature value which is determined to change with prescribed periodicity by the object periodicity determining step is determined to be a living body in the living body determining step, which ensures accurate determination as to whether the object is a living body. Therefore, according to the present invention, it is possible to accurately determine the type of the object by appropriately determining the periodicity in the movement of the object from the images.

A program for determining a type of an object of the present invention is for causing a computer to execute processing of determining a type of an object the image of which is picked up by an image pick-up means, wherein the program causes the computer to execute: object area extracting processing of extracting an area of an object from an image picked up by the image pick-up means; object end point extracting processing of extracting an end point of the image portion of the object from the area of the object extracted in the object area extracting processing; object periodicity determination processing of calculating time series data of a feature value representing a size of the image portion of the object using the end point of the image portion of the object extracted in the object end point extracting processing from the area of the object extracted in the object area extracting processing for respective ones of time series images picked up by the image pick-up means, to determine whether the feature value changes with prescribed periodicity; and living body determination processing of determining the object having the feature value which is determined to change with periodicity in the object periodicity determination processing as a living body (fifteenth invention).

According to the program for determining a type of an object of the fifteenth invention, it is possible to cause the computer to execute the processing that can produce the effects as described above in conjunction with the object type determination apparatus of the first invention.

DESCRIPTION OF THE PREFERRED EMBODIMENTS

First Embodiment

Figure 1:
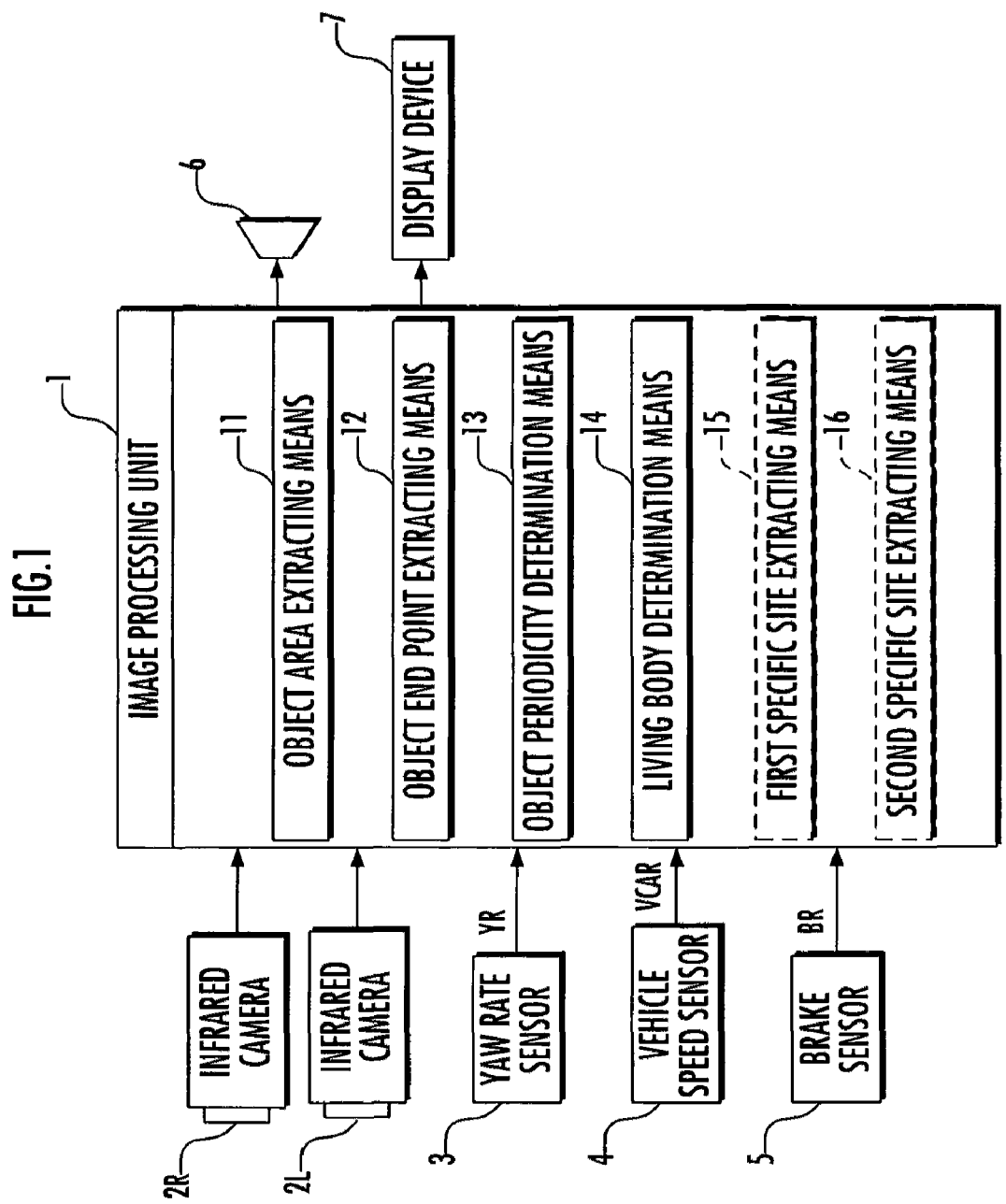
FIG. 1 is a functional block diagram of an object type determination apparatus according to a first embodiment.
Figure 3:
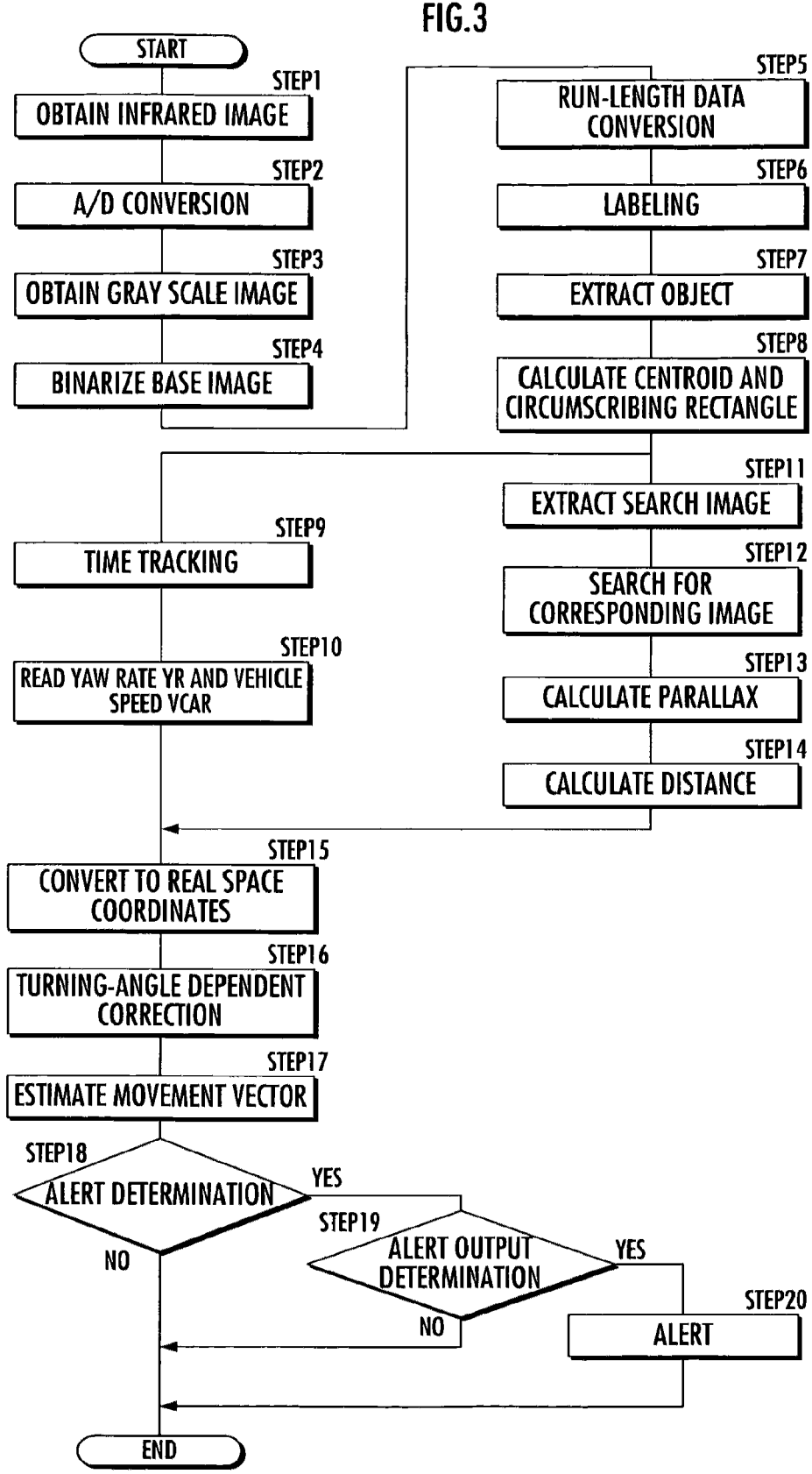
FIG. 3 is a flowchart illustrating object detecting and alerting operations in an image processing unit in the object type determination apparatus shown in FIG. 1.
Figure 4:
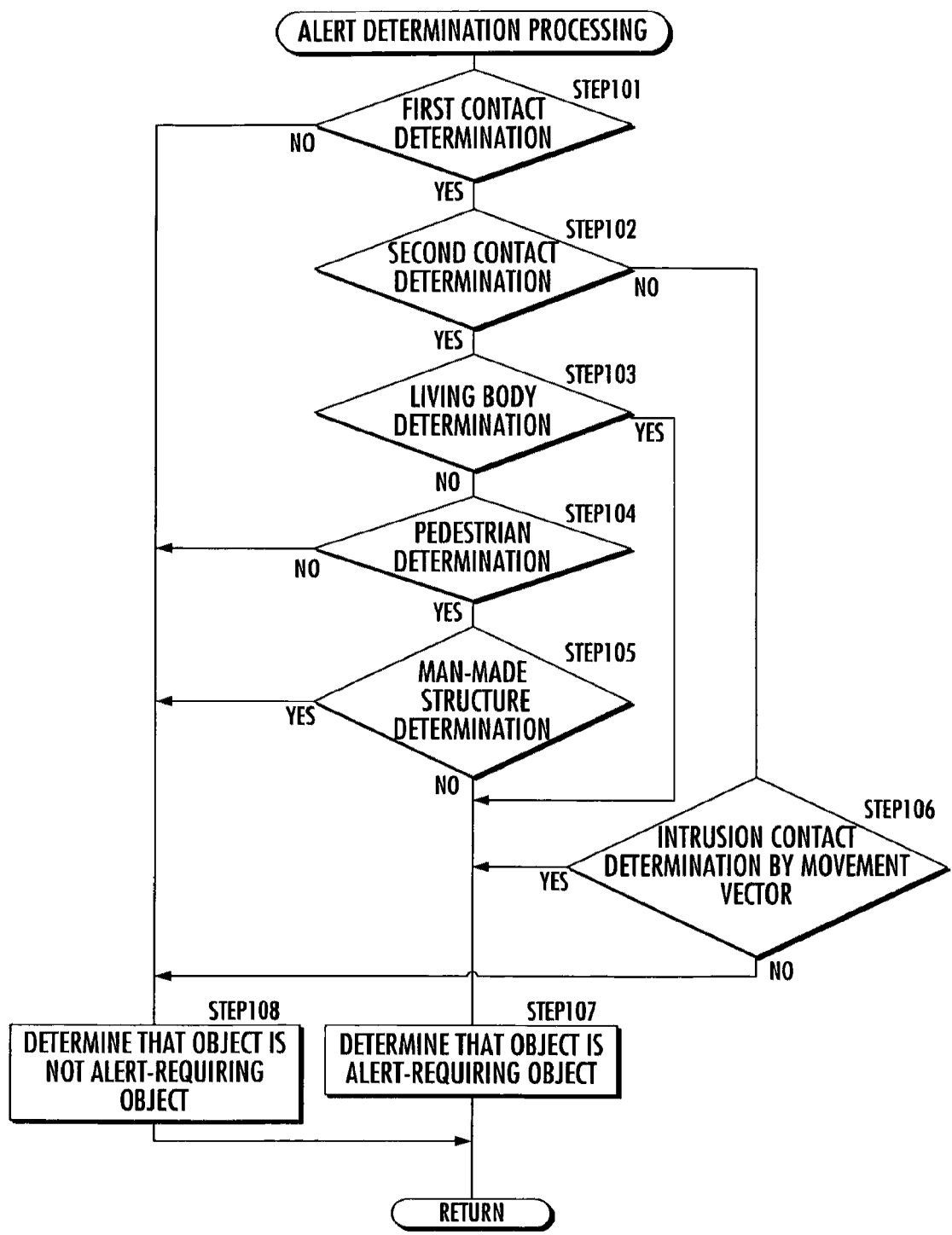
FIG. 4 is a flowchart illustrating alert determination processing in the object detecting and alerting operations shown in FIG. 3.
Figure 5:
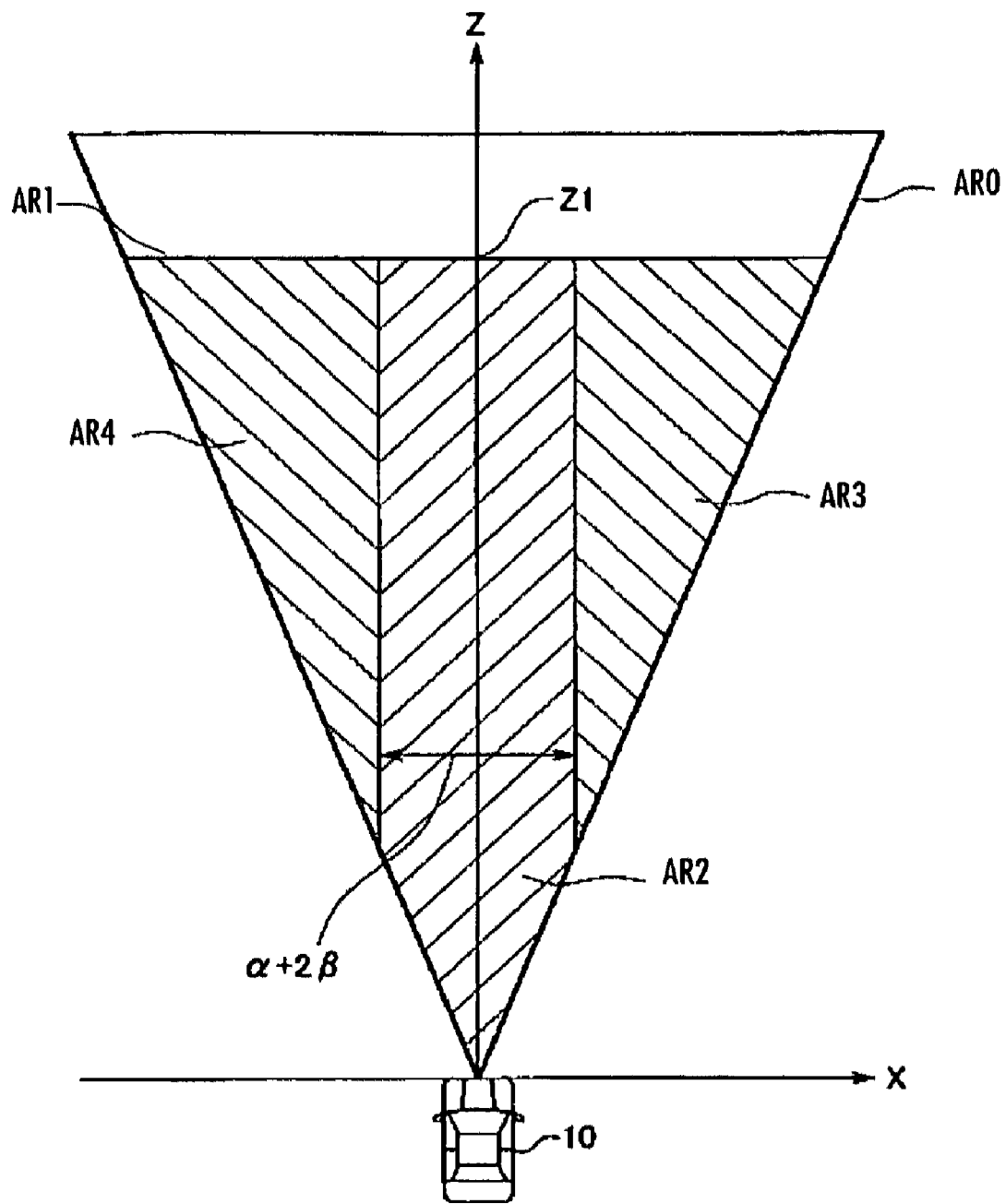
FIG. 5 illustrates sections in the area in front of the vehicle in the alert determination processing shown in FIG. 4.
Figure 6:
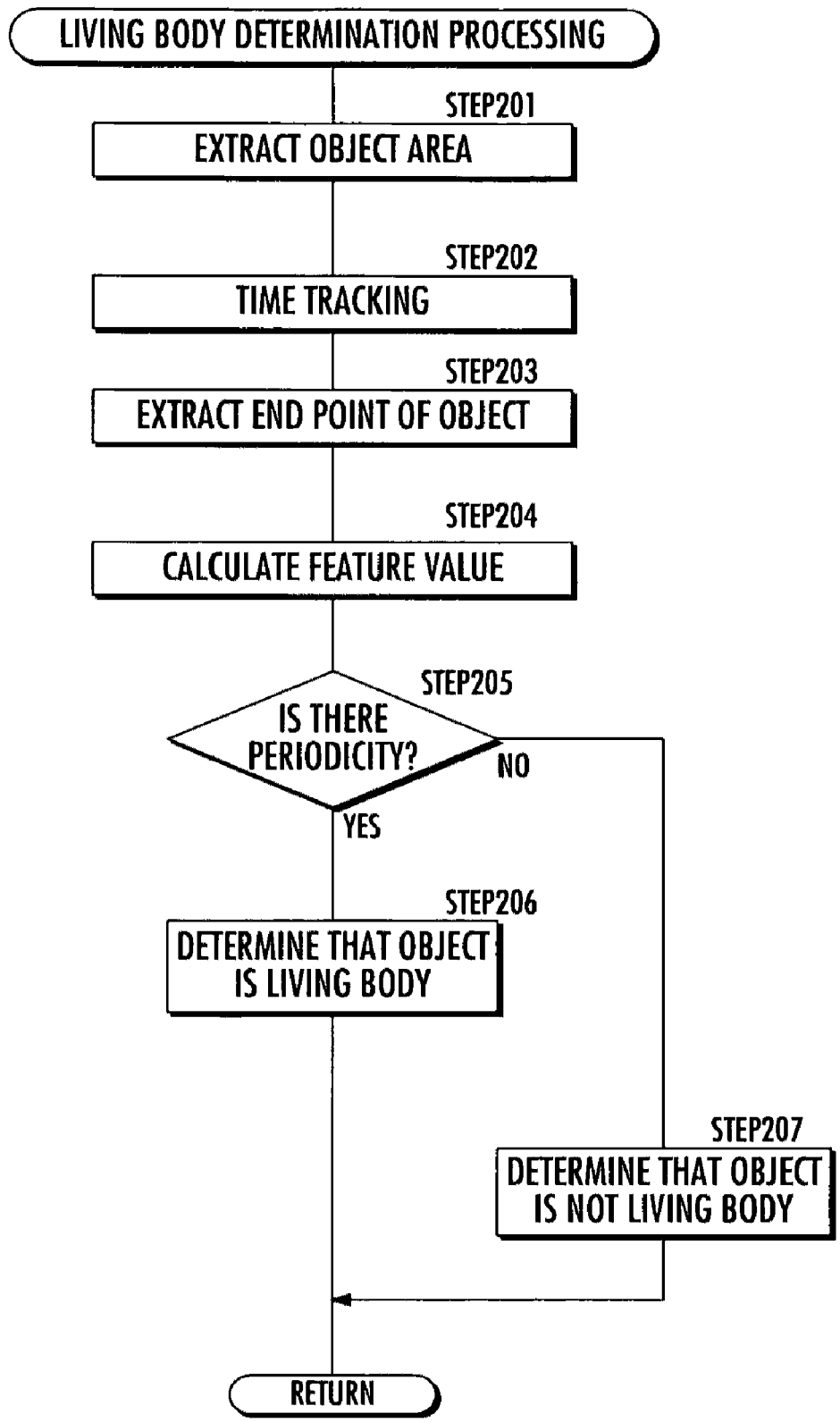
FIG. 6 is a flowchart illustrating living body determination processing in the alert determination processing in FIG. 4.

Embodiments of the present invention will be described with reference to the drawings. Firstly, a first embodiment will be described with reference to FIGS. 1 to 11. FIG. 1 is a functional block diagram of an object type determination apparatus according to the present embodiment, FIG. 2 illustrates how the object type determination apparatus shown in FIG. 1 is attached to a vehicle, FIG. 3 is a flowchart illustrating object detecting and alerting operations in the object type determination apparatus shown in FIG. 1, FIG. 4 is a flowchart illustrating alert determination processing in the object detecting and alerting operations shown in FIG. 3, FIG. 5 illustrates sections in the area in front of the vehicle in the alert determination processing shown in FIG. 4, FIG. 6 is a flowchart illustrating living body determination processing in the alert determination processing in FIG. 4, and FIGS. 7 to 11 illustrate the living body determination processing shown in FIG. 6.

Figure 2:
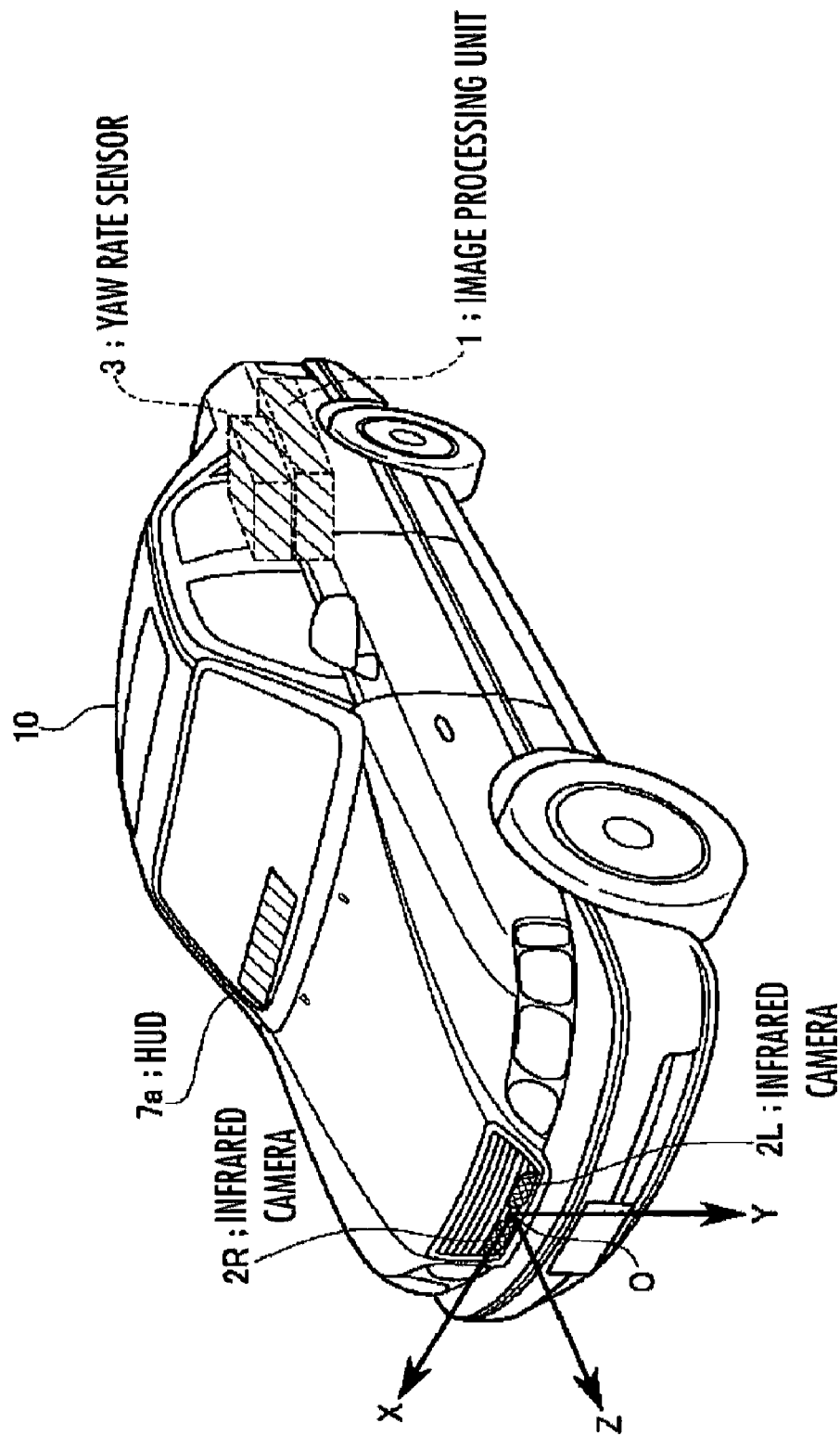
FIG. 2 illustrates how the object type determination apparatus shown in FIG. 1 is attached to a vehicle.

Referring to FIGS. 1 and 2, the object type determination apparatus of the present embodiment has an image processing unit 1 which is an electronic unit provided with a CPU (central processing unit). The image processing unit 1 is connected with two infrared cameras 2R and 2L, and is also connected with sensors for detecting traveling states of the vehicle 10, which include: a yaw rate sensor 3 sequentially detecting a yaw rate of the vehicle 10, a vehicle speed sensor 4 sequentially detecting a traveling speed of the vehicle 10 (vehicle speed), and a brake sensor 5 sequentially detecting braking operations performed on the vehicle 10.

The image processing unit 1 is also connected with a speaker 6 for outputting audible alert information by sound or the like, and a display device 7 for displaying the images picked up by the infrared cameras 2R and 2L as well as visual alert information. For example, the display device 7 is provided with a head up display (HUD) 7a for displaying information such as an image on a front window of the vehicle 10. The HUD 7a is arranged such that the screen is displayed on the front window of the vehicle 10 in the position not blocking the forward view of the driver.

The infrared cameras 2R and 2L are capable of detecting far infrared radiation, and each have a characteristic that the output signal level becomes higher (i.e., luminance increases) as the temperature of the object becomes higher. The infrared cameras 2R and 2L correspond to the image pick-up means of the present invention.

As shown in FIG. 2, the infrared cameras 2R and 2L are attached to a front portion of the vehicle 10 at a prescribed distance from each other, to pick up the images in front of the vehicle 10. The infrared cameras 2R and 2L are fixed to the front portion of the vehicle 10 so that their optical axes are parallel to each other and identical in height from the road surface.

The image processing unit 1, detailed illustration of which will not be provided, includes: an A/D converter circuit which converts an input analog signal to a digital signal; an image memory which stores image signals in the digital form; a computer (a processing circuit composed of CPU, memory, input/output circuit and others, or a microcomputer having their functions in a collective manner) which has an interface circuit for accessing the data stored in the image memory (for reading and writing) and carries out various kinds of processing on the images stored in the image memory; and others. It is configured such that the (analog) output signals from the infrared cameras 2R, 2L, the yaw rate sensor 3, the vehicle speed sensor 4, and the brake sensor 5 are converted to digital signals before being input to the computer.

The image processing unit 1 carries out, in each processing cycle, processing of detecting an object such as a pedestrian based on the input data, processing of determining whether the detected object satisfies a predetermined requirement and, if so, alerting the driver (to the object) via the speaker 6 and/or the display device 7, and other processing.

The above processing is implemented as the image processing unit 1 executes a program pre-installed in a memory of the image processing unit 1, which includes the program for determining a type of an object according to the present invention. It is noted that the program may be stored in the memory via a recording medium such as a CD-ROM. Alternatively, the program may be distributed or broadcast from an external server via a network or an artificial satellite, and received by a communication device mounted on the vehicle 10 to be stored in the memory.

More specifically, the image processing unit 1 includes, as the functions implemented by the above program: an object area extracting means 11 for extracting an area of an object from an image; an object end point extracting means 12 for extracting an end point of an image portion of the object from the area of the object; an object periodicity determination means 13 for determining whether a feature value representing a size of the image portion of the object changes with certain periodicity; and a living body determination means 14 for determining the object having the feature value determined to change with periodicity as a living body.

The object area extracting means 11 extracts an area of the object that exists in the vicinity of the vehicle 10, from the images picked up by the infrared cameras 2R and 2L. Specifically, the object area extracting means 11 subjects a prescribed base image (which is the image obtained via the infrared camera 2R in the present embodiment) out of the images obtained via the infrared cameras 2R and 2L to binarization processing and further to labeling processing, to extract an image portion of the object (i.e., a "binarized object"). Then, based on the binarized object thus extracted, the object area extracting means 11 extracts an image portion of the object in a gray scale image as the area of the object. As to the image area around the binarized object, the object area extracting means 11 obtains an image area in which a difference between the distance of that image area to the vehicle 10 and the distance of the binarized object to the vehicle 10 is within a predetermined range, and extracts an area containing the image area thus obtained and the binarized object as the area of the object.

The object end point extracting means 12 extracts an end point of the image portion of the object from the area of the object extracted by the object area extracting means 11. Specifically, the object end point extracting means 12 extracts, from edge points obtained by edge extracting processing performed on the area of the object in the gray scale image, an edge point satisfying a prescribed condition as the end point.

The object periodicity determination means 13 calculates time series data of a feature value representing a size of the image portion of the object, using the end point of the image portion of the object extracted by the object end point extracting means 12 from the area of the object extracted by the object area extracting means 11, for each of the time series images picked up by the infrared cameras 2R and 2L. In this case, the width of the image portion of the object in a lower part area (in which the images of the legs may be picked up in the case where the object is a pedestrian or the like) in the area of the object is used as the feature value representing the size of the object. Following the calculation of the time series data of the feature value, the object periodicity determination means 13 determines whether the feature value changes with predetermined periodicity, and whether the maximum amount of change of the feature value in a real space is within a predetermined range.

When a certain object is determined to have the feature value changing with periodicity and for which the maximum change amount of the feature value in the real space is within a predetermined range as a result of determination by the object periodicity determination means 13, the living body determination means 14 determines that object as a living body.

A first specific site extracting means 15 and a second specific site extracting means 16 shown by broken lines in FIG. 1 are provided in a fourth embodiment and a third embodiment, respectively, and will be described later.

In the following description, the image portions of the object in the real space, included in the images picked up by the infrared cameras 2R and 2L, will also be called the "objects", which are to be subjected to a series of image processing.

Now, overall operations (object detecting and alerting operations) of the object type determination apparatus of the present embodiment will be described with reference to the flowchart shown in FIG. 3. Referring to FIG. 3, the image processing unit 1 repeats the processing in STEP 1 to STEP 20 in each process cycle to carry out the object detecting and alerting operations. Firstly, the image processing unit 1 obtains infrared images which are output signals from the infrared cameras 2R and 2L (STEP 1), performs A/D conversion (STEP 2), and stores the gray scale images in the image memory (STEP 3). A right image $I_{GR}$ and a left image $I_{GL}$ are obtained from the infrared cameras 2R and 2L, respectively. The same object is displayed on these images with displacement in position in the lateral direction (x direction), which displacement (parallax) can be used to calculate the distance to the object.

Next, for the base image out of the gray scale images, the image processing unit 1 performs binarization of the image signals (STEP 4). Specifically, in the base image, an area where the luminance value of the image signal is higher than a threshold value $I_{th}$ is set to "1" (white), while an area where the luminance value is not higher than the threshold value is set to "0" (black). The threshold value $I_{th}$ is predetermined experimentally. The area set to "white" in the binarization processing corresponds to the area of the object (object area) which is displayed in a white color on the screen with a high luminance level (with high temperature) in the image obtained from the infrared camera 2R. It is noted that the area in the base image where the luminance value of the image signal is higher than the threshold value $I_{th}$ may be set to "0" (black), and the area where the luminance value is lower may be set to "1" (white).

Next, the image processing unit 1 generates run-length data from the area set to "white" in the binarization processing (hereinafter, referred to as a "binarized area") (STEP 5). In the run-length data generated, the binarized area is represented by a set of lines each composed of one-dimensional, connected pixels in the lateral direction of the image, and each line constituting the binarized area is indicated by the coordinates of its start point and the length (the number of pixels) from the start point to the end point.

Next, the image processing unit 1 performs labeling of an object based on the generated run-length data (STEP 6), to extract the object (STEP 7). Specifically, of the lines constituting the run-length data, the lines having the overlapping portions in the vertical direction (y direction) of the image are regarded as one object and labeled (assigned an identifier), to extract the connected area in the image as the object (the image portion of the object in the real space).

Through the processing in STEPS 5 to 7 described above, the binarized area is extracted as an object (binarized object) $T_k$. At this time, for example, the object having the label $T_k$ is shown by n pieces of run-length data L1 to Ln. It is noted that the extracted objects (binarized objects) may include, not only a pedestrian, bicycle rider, and animal on or near the road, but also another vehicle, electric pole, vending machine, and other man-made structures.

Next, the image processing unit 1 calculates an area S and a centroid position Gc of the extracted object, and a height Hb, a width Wb, a centroid position Gb, and an aspect ratio ASP of a rectangle circumscribing the object (STEP 8). Specifically, the area $S_k$ of the object $T_k$ is calculated by summing the lengths of the lines indicated by the respective pieces of run-length data Li (i=1, ..., n) for the n pieces of run-length data of the object $T_k$.

The coordinates of the centroid $Gc_k$ of the object $T_k$ are calculated in the following manner. The length of the line indicated by each piece of run-length data Li is multiplied by the coordinates (x[i], y[i]) of the middle point of the corresponding line, which is summed up for the n pieces of run-length data of the object $T_k$, and the summation is divided by the area $S_k$. The aspect ratio $ASP_k$ of the rectangle circumscribing the object $T_k$ is calculated as a ratio $Hb_k/Wb_k$ of the height (length in the vertical direction) $Hb_k$ to the width (length in the lateral direction) $Wb_k$ of the rectangle circumscribing the object $T_k$. The image portion $R_k$ of the object $T_k$ corresponds to the entire area of the rectangle circumscribing the object $T_k$.

Next, the image processing unit 1 performs time tracking of the object, that is, processing of recognizing an identical object in each process cycle of the image processing unit 1 (STEP 9). In this identical object recognition processing, in the case where an object $T_k$ is extracted in the processing in STEP 7 at time k and an object $T_{k+1}$ is extracted in the processing in STEP 7 at time k+1 in the following process cycle, it is determined whether the two objects $T_{k+1}$ and $T_k$ are identical (i.e., whether the object $T_{k+1}$ and the object $T_k$ are image portions of the identical object in the real space).

Specifically, the object $T_{k+1}$ and the object $T_k$ are determined to be the image portions of the identical object in the case where the amounts of change of the area S, the centroid position Gc, and the aspect ratio ASP therebetween are not greater than the predetermined, maximum allowable values for the respective changes. When it is determined that the object $T_{k+1}$ and the object $T_k$ are the image portions of the identical object, the object $T_{k+1}$ is relabeled with the same label as the object $T_k$. In this manner, the object $T_{k+1}$ and the object $T_k$ are recognized as the identical object and tracked over time. This identical object recognition processing is carried out on the base image.

Next, the image processing unit 1 reads a yaw rate YR detected by the yaw rate sensor 3 and a vehicle speed (in the horizontal direction) VCAR detected by the vehicle speed sensor 4 (STEP 10). In this STEP 10, the yaw rate YR is time integrated as well, for calculation of a turning angle θr of the vehicle 10.

The image processing unit 1 carries out the processing in STEPS 11 to 14 in parallel with the processing in STEPS 9 and 10. The processing in STEPS 11 to 14 is for calculating a distance z (in the longitudinal direction of the vehicle 10) between the object and the vehicle 10. Specifically, the image obtained via the infrared camera 2L is searched for an object corresponding to the object extracted in the base image, and the distance z between the object and the vehicle 10 is calculated based on displacement (parallax) of the object in the images obtained by the two infrared cameras 2R and 2L. As a specific technique for calculating the distance to the object based on the images, the technique as described in Japanese Patent Application Laid-Open No. 2001-006096 (Patent Document 1 described above) filed by the applicant, for example, may be used.

Firstly, the image processing unit 1 selects one of the objects tracked by the binarized image of the base image, and extracts a search image R1 from the base image (the entire area of the rectangle circumscribing the selected object is set as the search image) (STEP 11).

Next, the image processing unit 1 sets a search area in a referenced image (one of the right and left images obtained by the infrared cameras 2R and 2L that is not the base image) to search for an image (hereinafter, referred to as a "corresponding image") corresponding to the search image R1, and performs a correlation operation to extract the corresponding image (STEP 12). Specifically, it sets a search area R1a in the referenced image in accordance with the coordinates of the respective vertices of the search image R1, and in the search area R1a, it sets a local area R1b having the same shape as that of the search image R1 with the coordinates (x0, y0) as the base point (vertex on the upper left of the area).

Then, by moving the local area R1b within the search area R1a by changing the coordinates (x0, y0) of the base point, it calculates the sum of absolute difference (SAD) C (x0, y0) of the luminance value indicating the degree of correlation between the local area R1b and the search image R1, according to the following expression (1).

$$C(x0, y0) = \sum_{n=0}^{N-1}\sum_{m=0}^{M-1} |IL(x0+m, y0+n) - IR(m, n)| \quad (1)$$

To obtain the sum of absolute difference C (x0, y0), an absolute value of the difference between the luminance value IR of the pixel at the coordinates (m, n) in the search image R1 and the luminance value IL of the pixel at the coordinates (x0+m, y0+n) in the local area R1b having the coordinates (x0, y0) in the search area R1a as its base point is calculated, and a total sum of this absolute value of the difference for all the pixels (m=0, ..., M−1, n=0, ..., N−1) in the search image R1 and the local area R1b is obtained.

It is noted that the smaller value of the sum of absolute difference C (x0, y0) indicates the higher degree of correlation between the search image R1 and the local area R1b.

Therefore, the coordinates (x0, y0) of the base point where the sum of absolute difference C (x0, y0) becomes minimal is obtained, and the local area R1b in this position is extracted as the corresponding image R1c. This correlation operation is performed on the gray scale image, rather than the binarized image. The search image R1 in the base image and the corresponding image R1c in the referenced image are extracted through the processing in STEPS 11 and 12.

Next, the image processing unit 1 calculates a parallax Δd (the number of pixels) based on the centroid position of the search image R1 and the centroid position of the corresponding image R1c (STEP 13). Then, the image processing unit 1 uses the calculated parallax Δd to calculate the distance z between the object and the vehicle 10, according to the following expression (2) (STEP 14).

$$z = \frac{B \cdot f}{\Delta d \cdot p} \quad (2)$$

In the expression, B represents a base-line length (distance between the optical axes) of the infrared cameras 2R and 2L, f represents a focal length of the infrared cameras 2R and 2L, and p represents pixel spacing.

Following the processing in STEP 10 and STEP 14, the image processing unit 1 converts the coordinates (x, y) and the distance z in the image to the real space coordinates, to calculate the real space position which is the position of each object in the real space (the position relative to the vehicle 10) (STEP 15). Here, as shown in FIG. 2, the real space position refers to the position (X, Y, Z) in the real space coordinate system (XYZ coordinate system) having its origin point set to a middle point (fixed to the vehicle 10) between the mounting positions of the infrared cameras 2R and 2L.

The X and Y directions in the real space coordinate system correspond respectively to the left-right direction (width direction) and the up-down direction of the vehicle 10, and also correspond respectively to the x direction (lateral direction) and the y direction (vertical direction) of the right and left images described above. Further, the Z direction in the real space coordinate system corresponds to the longitudinal direction of the vehicle 10. The real space position (X, Y, Z) is calculated according to the following expression (3).

$$X = \frac{x \cdot z \cdot p}{f} \quad (3)$$
$$Y = \frac{y \cdot z \cdot p}{f}$$
$$Z = z$$

Next, the image processing unit 1 corrects the real space position of the object using the turning angle θr calculated in STEP 10, so as to increase the accuracy of the real space position of the object by compensating for the influence of the change of the turning angle of the vehicle 10 (STEP 16). For example in the case where the vehicle 10 turns in the left direction by a turning angle θr during the period from time k to time k+1, the images obtained by the infrared cameras 2R and 2L have their image ranges displaced in the x direction. The turning angle-dependent correction is for correcting such displacement. In the following description, the real space position of the object refers to the real space position of the object as a result of this turning angle-dependent correction.

Next, the image processing unit 1 obtains a movement vector of the object with respect to the vehicle 10 (STEP 17). Specifically, a straight line approximating the time series data of the real space position of the identical object during a predetermined period of time dT (from the current time back to a predetermined time) is obtained, and a vector extending from the position of the object on the straight line at the time the predetermined time before (coordinates PvdT=(XvdT, YvdT, ZvdT)) to the position of the object on the straight line at the current time (coordinates Pv0=(Xv0, Yv0, Zv0) is obtained as the movement vector of the object. As a specific technique for calculating the approximate straight line, the technique described in Japanese Patent Application Laid-Open No. 2003-284057 filed by the applicant, for example, may be used.

Next, the image processing unit 1 performs alert determination processing in which it determines the possibility of contact between the detected object and the vehicle 10 to determine whether the object is an alert-requiring object (an object to which the driver should be alerted) (STEP 18). The alert determination processing will be described later in detail. If it is determined in STEP 18 that the detected object is not an alert-requiring object (the result of determination in STEP 18 is NO), the process returns to STEP 1, and the above-described processing is repeated. If it is determined in STEP 18 that the detected object is an alert-requiring object (the result of determination in STEP 18 is YES), the process proceeds to STEP 19.

In STEP 19, the image processing unit 1 performs alert output determination processing in which it determines whether to alert the driver of the vehicle 10 to the object. In this alert output determination processing, if it is confirmed from the output BR of the brake sensor 5 that the driver has performed the braking operation on the vehicle 10 and if the deceleration of the vehicle 10 (having a positive value when the vehicle speed is reduced) is greater than a predetermined threshold value (>0), it is determined not to issue the alert. In contrast, if the driver has not performed the braking operation, or even if the driver performs the braking operation, if the deceleration of the vehicle 10 is not greater than the predetermined threshold value, it is determined that the alert should be output.

If the image processing unit 1 determines that the alert should be output (the result of determination in STEP 19 is YES), the image processing unit 1 performs alert processing in which the driver of the vehicle 10 is alerted via the speaker 6 and the display device 7 (STEP 20), and the process returns to STEP 1 to repeat the above-described processing. In this alert processing, for example, the base image is displayed on the display device 7, and the image of the object which is the alert-requiring object within the base image is highlighted. Further, a voice alert is output from the speaker 6 to notify the driver of the presence of the object which is the alert-requiring object. The alert to the driver may be output from only one of the speaker 6 and the display device 7.

If it is determined in STEP 19 that it is unnecessary to output an alert (for all the objects), the result of determination in STEP 19 is NO, in which case the process returns to STEP 1 to repeat the above-described processing.

Described above are the object detecting and alerting operations by the image processing unit 1 of the object type determination apparatus of the present embodiment. With these operations, the object such as a pedestrian ahead of the vehicle 10 is detected from the infrared images around the vehicle 10 and the signals indicating the traveling states of the vehicle 10, and the driver is alerted to the object which is the alert-requiring object.

Hereinafter, the alert determination processing in STEP 18 in the flowchart shown in FIG. 3 will be described in detail with reference to the flowchart shown in FIG. 4. The alert determination processing is the processing of determining whether a detected object is an alert-requiring object, by determining the possibility of contact between the detected object and the vehicle 10 as well as the type of the object through first contact determination processing, second contact determination processing, intrusion contact determination processing, living body determination processing, pedestrian determination processing, and man-made structure determination processing, which are now described.

Referring to FIG. 4, firstly, the image processing unit 1 performs the first contact determination processing which is one of the processing of determining the degree of possibility of contact of the object with the vehicle 10 (STEP 101). The first contact determination processing is for determining whether the contact between the object and the vehicle 10 can be avoided in good time by the steering or braking operation of the vehicle 10. Specifically, in the first contact determination processing, it is determined whether the current real space position of the object is within an area AR1 (hereinafter, Preferred to as the "first contact determination area") where the distance in the Z direction (i.e., the distance in the longitudinal direction of the vehicle 10) from the vehicle 10 is not greater than a predetermined value, in an area AR0 in front of the vehicle 10 the images of which are picked up by the infrared cameras 2R and 2L (i.e., the area within the angles of visibility of the infrared cameras 2R and 2L).

In this case, the predetermined value regarding the distance from the vehicle 10 is set for each object. More specifically, the relative speed Vs (=(Zv0−ZvdT)/dT) of the object to the vehicle 10 in the Z direction is obtained, and the value Vs×T1 obtained by multiplying the relative speed Vs by a predetermined time T1 (two to five seconds, for example) is set as the above-described predetermined value for defining the boundary of the first contact determination area AR1 in the Z direction. If the relative speed Vs indicates that the object is moving away from the vehicle 10, it is determined that the object is not within the first contact determination area AR1.

Here, description will be made with reference to FIG. 5. FIG. 5 shows a road, as seen from above, on which the vehicle 10 is traveling. In the figure, sections of the area in front of the vehicle 10 are shown. As shown in FIG. 5, when the area AR0 is expressed as the outermost triangle area delimited by the bold lines, the first contact determination area AR1 is the area which is within the area AR0 and which is closer to the vehicle 10 than Z1 (=Vs×T1). The first contact determination area AR1 has a prescribed height H (about twice the height of the vehicle 10, for example) in the vertical direction. Therefore, in the case where the object's current coordinate value (distance) Zv0 in the Z direction and coordinate value (height) Yv0 in the Y direction are not greater than Vs×T1 and not greater than H, respectively, it is determined that the object is within the first contact determination area AR1.

When the result of determination in STEP 101 is NO (i.e., when the object does not exist in the first contact determination area AR1), the contact between the object and the vehicle 10 can be avoided in good time with the steering or braking operation of the vehicle 10. In this case, the process proceeds to step S108, where the image processing unit 1 determines that the object is not an alert-requiring object, and terminates the alert determination processing.

When the result of determination in STEP 101 is YES (i.e., when the object exists in the first contact determination area AR1), the process proceeds to STEP 102, where the image processing unit 1 performs the second contact determination processing which is another one of the processing of determining the degree of possibility of contact of the object with the vehicle 10. The second contact determination processing is for determining whether the possibility of contact between the object and the vehicle 10 is high if the real space position of the object is maintained at the current position. More specifically, in the second contact determination processing, it is determined whether the object is within an area AR2 (hereinafter, referred to as the "second contact determination area"), as shown in FIG. 5, which is in the first contact determination area AR1 and has a width ($\alpha+2\beta$) with margins $\beta$ added to the respective sides of the vehicle width $\alpha$ of the vehicle 10. The second contact determination area AR2 also has the prescribed height H.

When the result of determination in STEP 102 is YES (i.e., when the object is within the second contact determination area AR2), there is a high possibility of contact of the object with the vehicle 10 if the object stays at the current real space position. In this case, the process proceeds to STEP 103, where the image processing unit 1 performs the living body determination processing of determining whether the object moves periodically, i.e., whether the object is a living body (pedestrian, bicycle rider, animal or other living body). The living body determination processing will be described later in detail.

When the result of determination in STEP 103 is YES (i.e., when the object is a living body moving periodically), the process proceeds to STEP 107, where the image processing unit 1 determines that the object is an alert-requiring object, and terminates the alert determination processing. As such, it is determined that the object is an alert-requiring object in the case where it is determined that the object is in the second contact determination area in the first contact determination area and that the object shows certain movement.

When the result of determination in STEP 103 is NO (i.e., when the object is not a living body that moves periodically), the process proceeds to STEP 104, where the image processing unit 1 performs the pedestrian determination processing of determining whether there is a possibility that the object is a pedestrian. The pedestrian determination processing is the processing of determining that the object is a pedestrian in the case where a characteristic suggesting a pedestrian is detected from the image of the object, which may be that the shape matches a shape of the pedestrian registered in advance. For the pedestrian determination processing, the technique disclosed in the above-mentioned Japanese Patent Application Laid-Open No. 2003-284057, for example, may be used.

When the result of determination in STEP 104 is YES (i.e., when there is a possibility that the object is a pedestrian), the process proceeds to STEP 105, where the image processing unit 1 performs the man-made structure determination processing of determining whether the object is a man-made structure, so as to increase the reliability of determination that there is a possibility of the object being a pedestrian. The man-made structure determination processing is the processing of determining that the object is a man-made structure and excluding the object from the objects of alerting in the case where a characteristic not considered to be a pedestrian, such as that the shape matches a shape of the man-made structure registered in advance, is detected from the image of the object. This man-made structure determination processing excludes the object for which the possibility of contacting the vehicle 10 is low, such as a vehicle traveling ahead, from the alert-requiring objects.

When the result of determination in STEP 105 is NO (i.e., when the object is not a man-made structure and, hence, is likely a pedestrian), the process proceeds to STEP 107, where the image processing unit 1 determines that the object is an alert-requiring object, and terminates the alert determination processing. As such, the object is determined to be an alert-requiring object in the case where it is determined that the object is in the second contact determination area included in the first contact determination area, that the object is not a living body moving periodically, that there is a high possibility that the object is a pedestrian, and that the object is not a man-made structure.

When the result of determination in STEP 104 is NO (i.e., when the object is not likely a pedestrian) or when the result of determination in STEP 105 is YES (i.e., when the object is a man-made structure), the process proceeds to STEP 108, where the image processing unit 1 determines that the object is not an alert-requiring object, and terminates the alert determination processing.

When the result of determination in STEP 102 is NO (i.e., when the object is not in the second contact determination area AR2), the process proceeds to STEP 106, where the image processing unit 1 performs the intrusion contact determination processing which is one of the processing of determining the degree of possibility of contact of the object with the vehicle 10. The intrusion contact determination processing is the processing of determining whether there is a high possibility that the object would enter the second contact determination area AR2 and contact the vehicle 10.

In the intrusion contact determination processing, it is determined, as shown in FIG. 5, whether the object that is in an area AR3 or AR4 (hereinafter, each referred to as the "intrusion determination area") within the first contact determination area AR1, where the absolute value of the X coordinate is greater than in the second contact determination area AR2 (i.e., extending outside in the lateral direction of the second contact determination area AR2), will enter the second contact determination area AR2 and contact the vehicle 10, based on a movement vector of the object. The intrusion determination areas AR3 and AR4 also have the prescribed height H.

Specifically, in the case where the X coordinate (position in the vehicle width direction) of the crossing point between the XY plane (orthogonal to the longitudinal direction of the vehicle 10) in front of the vehicle 10 and the straight line containing the movement vector of the object is within a predetermined range slightly wider than the vehicle width a of the vehicle 10 (i.e., in the case where the object is relatively approaching the vehicle 10), then it is determined that there is a high possibility that the object will enter the second contact determination area AR 2 and contact the vehicle 10.

When the result of determination in STEP 106 is YES, there is a high possibility of collision of the object with the vehicle 10 in the future. Thus, in such a case, the process proceeds to STEP 107, where the image processing unit 1 determines that the object is an alert-requiring object, and terminates the alert determination processing. When the result of determination in STEP 106 is NO, the possibility of contact of the object with the vehicle 10 is low, and thus, the process proceeds to STEP 108, where the image processing unit 1 determines that the object is not an alert-requiring object, and terminates the alert determination processing.

The alert determination processing has been described in detail above. This processing appropriately determines whether the object detected based on the infrared images of the surroundings of the vehicle 10 and the signals indicating the traveling states of the vehicle 10 is an alert-requiring object such as a pedestrian.

Hereinafter, the living body determination processing in STEP 103 in the flowchart shown in FIG. 4 will be described in detail with reference to the flowchart shown in FIG. 6 and the illustrations in FIGS. 7 to 11.

In the living body determination processing, the image processing unit 1 calculates time series data of a feature value representing the size of the object from the time series images obtained within a predetermined period of time S, determines whether the calculated feature value changes with certain periodicity, and, based on the result of determination, determines whether the object is a living body. In the present embodiment, the images picked up in STEP 1 are obtained at a time in each process cycle. The predetermined period of time S corresponds to N process cycles. For example, in the process cycle of time k, the time series data of the feature value is calculated from N time series images picked up in the respective process cycles from time k−N+1 to time k. In the following, the case of calculating the time series data of the feature value in the process cycle of time k will be described by way of example. The predetermined period of time S may be 1 [sec], for example.

Figure 7:
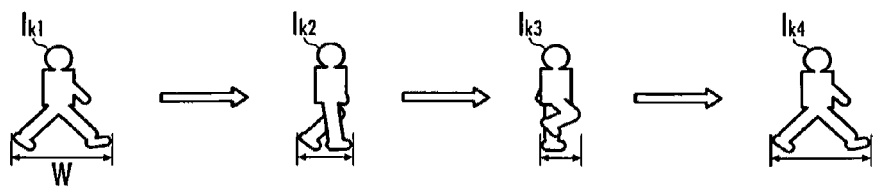
FIG. 7 shows an example of time series images in the living body determination processing shown in FIG. 6.
Figure 7:
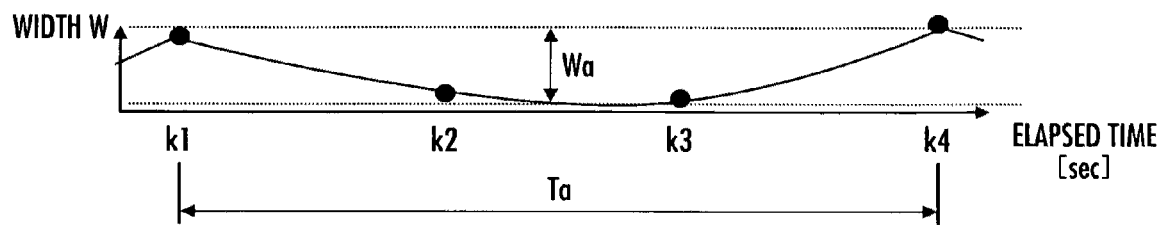

Specifically, in the following, the case where a pedestrian is walking across the road in front of the vehicle 10 will be described. FIG. 7(*a*) illustrates times series images $I_{k1}$ to $I_{k4}$ of a pedestrian picked up at times k1 to k4, respectively, included in the predetermined period of time S. FIG. 7(*b*) is a graph showing a change over time of the width W of the legs of the pedestrian illustrated in FIG. 7(*a*). In FIG. 7(*b*), the horizontal axis represents an elapsed time, and the vertical axis represents the width W, with the values of the width W at the respective times k1 to k4 shown by black circles. In the example shown in FIG. 7, the width W changes in a cycle of Ta and with a maximum change amount of Wa. The cycle Ta of the change of the width W in the walking motion of the pedestrian is about 1 [sec], for example, and the maximum change amount Wa of the width W when the walking motion of the pedestrian is seen from a side is about 60 [cm], for example.

Firstly in STEP 201, the image processing unit 1 extracts an area of the object (or, an object area) from the image (the base image in the present embodiment) in each process cycle. This corresponds to the processing of the object area extracting means 11.

Specifically, the image processing unit 1 firstly performs the binarization processing and the labeling processing on the image taken in each process cycle, as in STEPS 4 to 7 described above, to extract a binarized object. In the present embodiment, the binarized object extracted in STEP 7 above is used as it is.

Next, the image processing unit 1 calculates the distance of the extracted binarized object to the vehicle 10. In the present embodiment, the distance to the vehicle 10 calculated in STEP 14 above is used as it is. Next, the image processing unit 1 sets a plurality of mask areas in the vertical direction of the extracted binarized object. The image processing unit 1 then calculates the distance to the vehicle 10 for each mask area, as in STEPS 11 to 14 described above.

Next, the image processing unit 1 calculates a difference between the distance of the binarized object to the vehicle 10 and the distance of each mask area to the vehicle 10. Next, the image processing unit 1 obtains any of the mask areas for which the calculated difference falls within a predetermined range. The image processing unit 1 then extracts an area containing the binarized object and the obtained mask area(s) as an object area.

Figure 8:
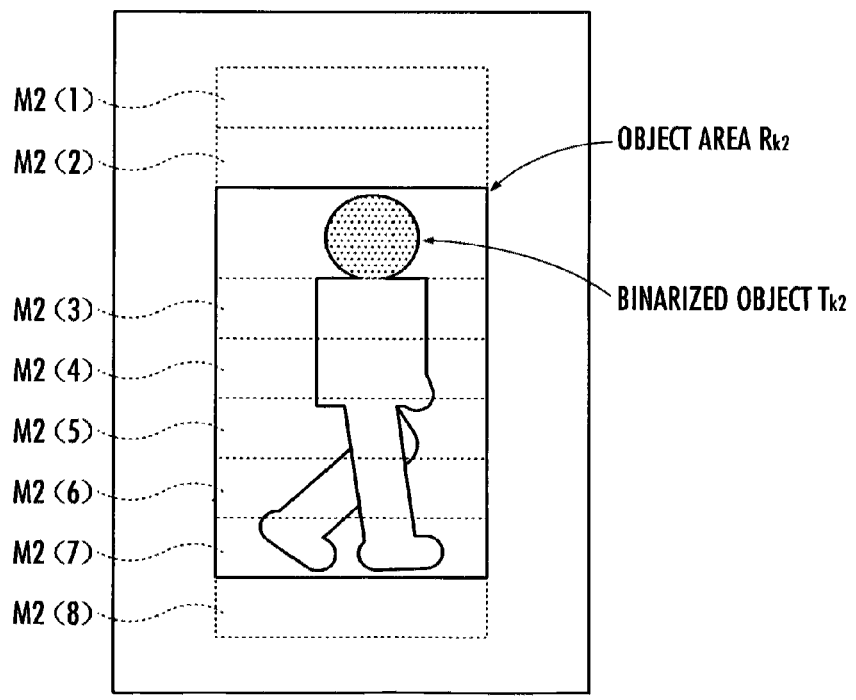
FIG. 8 illustrates processing of extracting an area of the object in the living body determination processing in FIG. 6.

The processing of extracting an object area described above will now be explained taking as an example the image $I_{k2}$ picked up in the process cycle at time k2, as shown in FIG. 7(*a*). At this time, as shown in FIG. 8, a binarized object $T_{k2}$ (shown in broken color in the figure) is extracted from the picked-up image $I_{k2}$. Then, as shown in FIG. 8, mask areas M2(1) to M2(8) are set above and below the extracted binarized object $T_{k2}$. Next, of the mask areas M2(1) to M2(8), the mask areas M2(3) to M2(7) each having a distance to the vehicle 10 falling within a predetermined range are obtained. The area containing the binarized object $T_{k2}$ and the mask areas M2(3) to M2(7) thus obtained is extracted as an object area $R_{k2}$.

Next, in STEP 202, the image processing unit 1 performs time tracking of the object, i.e., the processing of recognizing an identical object in each process cycle of the image processing unit 1. In the following, description will be made about the case where time tracking of the object is carried out between the image $I_{k1}$ picked up at time k1 and the image $I_{k2}$ picked up at time k2, as illustrated in FIG. 7(*a*). For the binarized objects $T_{k1}$ and $T_{k2}$ extracted from the images $I_{k1}$ and $I_{k2}$, the distances to the vehicle 10 are denoted by $Z_{k1}$ and $Z_{k2}$, respectively.

Figure 9:
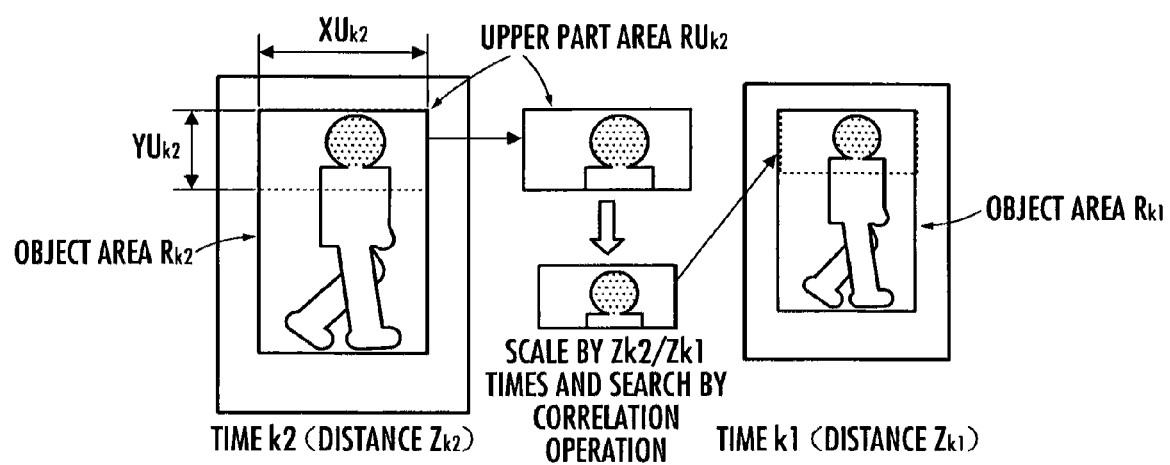
FIG. 9 illustrates processing of tracking an object over time in the living body determination processing in FIG. 6.

As shown in FIG. 9, the image processing unit 1 firstly sets an upper part area $RU_{k2}$ having a width $XU_{k2}$ and a height $YU_{k2}$ in the object area $R_{k2}$ in the image $I_{k2}$ picked up at time k2. The height $YU_{k2}$ is set based on a prescribed height in the real space (for example if the object is assumed to be a pedestrian, the height allowing the image of the upper body part to be picked up), by converting it to the value in the image space using the distance $Z_{k2}$ of the binarized object $T_{k2}$ in the object area $R_{k2}$ to the vehicle 10, the focal length f, and the pixel spacing p. That is, the upper part area $RU_{k2}$ is the area corresponding to the upper body part of the pedestrian.

Next, the image processing unit 1 scales the upper part area $RU_{k2}$ by $Z_{k2}/Z_{k1}$ times to obtain a search image (template). It then extracts, from the image $I_{k1}$ at time k1, an image area corresponding to the search image by performing the correlation operation as in STEP 11 described above, and sets the extracted area as an upper part area $RU_{k1}$ in the image $I_{k1}$ at time k1 (template matching). Next, based on the upper part area $RU_{k1}$, the image processing unit 1 changes the size of the object area $R_{k2}$ in accordance with the distance, to set an object area $R_{k1}$ in the image $I_{k1}$. Because the upper body part of the pedestrian moves in a relatively small amount, performing the template matching using the upper part area in the object area as the search image (template) ensures accurate time tracking of the object.

Figure 10:
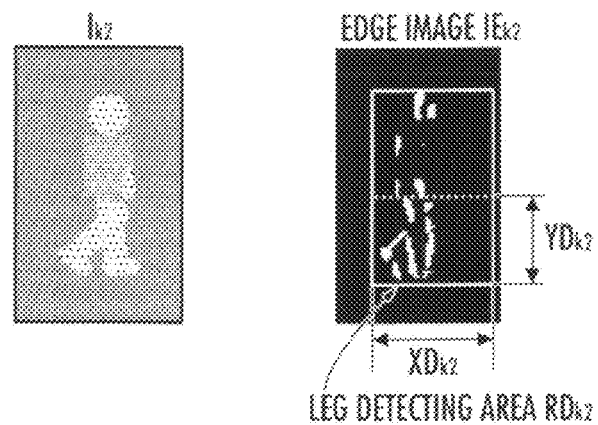
FIG. 10 illustrates processing of extracting an end point of an image portion of the object in the living body determination processing in FIG. 6.
Figure 10:
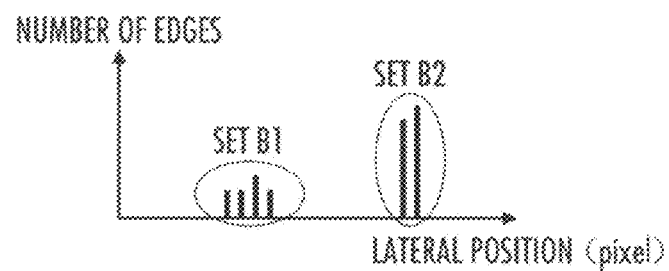
Figure 10:
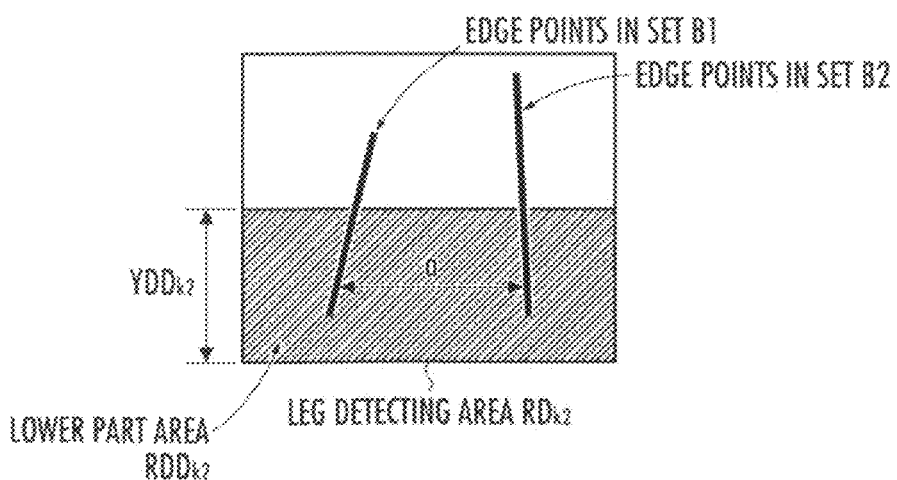
Figure 11:
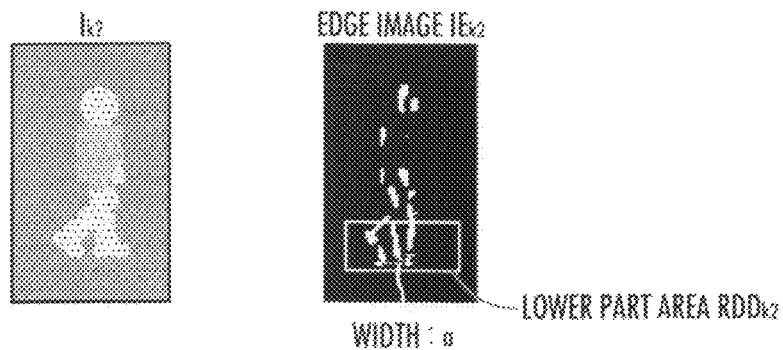
FIG. 11 illustrates processing of determining periodicity in the living body determination processing in FIG. 6.
Figure 11:
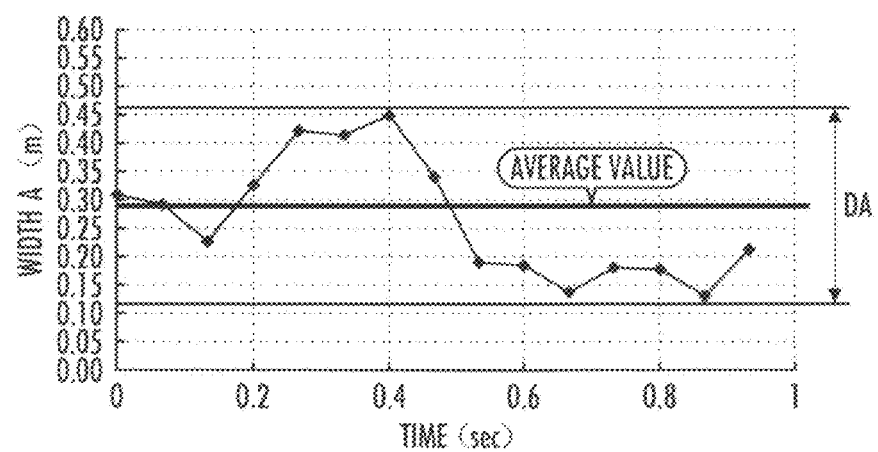
Figure 11:
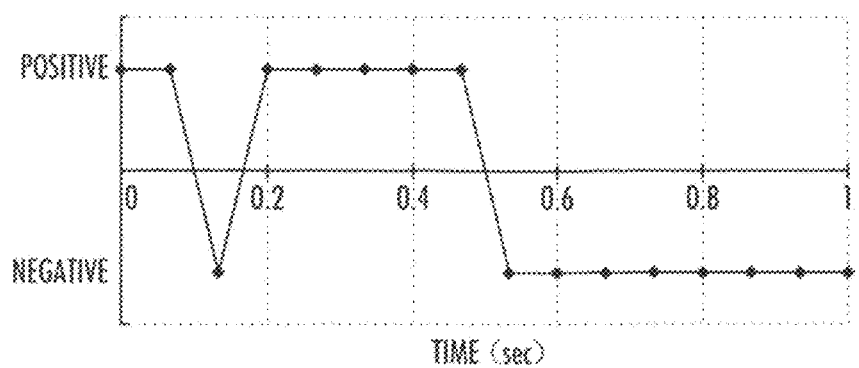

Next, in STEP 203, the image processing unit 1 extracts an end point of the object from the area of the object. This corresponds to the processing by the object end point extracting means 12. Specifically, as shown in FIG. 10(*a*), the image processing unit 1 firstly performs edge extracting processing on the object area $R_{k2}$ in the image $I_{k2}$ to extract edge points. In the gray scale image $I_{k2}$ in FIG. 10(*a*), the luminance level is schematically shown in broken color (the lower density in the broken color indicates the higher luminance level). In the edge image $IE_{k2}$, the extracted edge points are shown (white portions in the figure of the edge image $IE_{k2}$).

Next, the image processing unit 1 sets a leg detecting area $RD_{k2}$ having a width $XD_{k2}$ and a height $YD_{k2}$ in the object area $R_{k2}$. The height $YD_{k2}$ is set based on a prescribed height in the real space (for example in the case where the object is a pedestrian, the height in which the image of the lower body part can be picked up), by converting it to the value in the image space using the distance $Z_{k2}$ of the binarized object $T_{k2}$ in the object area $R_{k2}$ to the vehicle 10, the focal length f, and the pixel spacing p. The prescribed height may be about 1 [m], for example.

Next, the image processing unit 1 counts the edge points in the leg detecting area $RD_{k2}$ in the vertical direction. FIG.

10(b) is a graph showing the results of counting, with the horizontal axis representing the position [pixel] in the lateral direction in the image and the vertical axis representing the number of edge points. The image processing unit 1 then extracts, from the sets of the edge points present continuously in the lateral direction, any set containing the edge points whose number is not less than a predetermined threshold value TH.

The predetermined threshold value TH is set based on a predetermined length in the real space, by converting it to the value in the image space using the distance $Z_{k2}$ of the binarized object $T_{k2}$ in the object area $R_{k2}$ to the vehicle 10, the focal length f, and the pixel spacing p. The predetermined length may be about 50 [cm], for example. In this manner, in the example shown in FIG. 10(b), the sets B1 and B2 are extracted. The edge points contained in these extracted sets B1 and B2 are the end points of the object. The edge image is schematically shown in FIG. 10(c).

Next, in STEP 204, the image processing unit 1 calculates a feature value representing the size of the object, based on the end points of the object extracted in STEP 203. As shown in FIG. 10(c), firstly, the image processing unit 1 sets a lower part area $RDD_{k2}$ having a height $YDD_{k2}$ in the leg detecting area $RD_{k2}$. The height $YDD_{k2}$ is set based on a prescribed height in the real space (for example if the object is assumed to be a pedestrian, the height in which the image of the legs can be picked up), by converting it to the value in the image space using the distance $Z_{k2}$ of the binarized object $T_{k2}$ in the object area $R_{k2}$ to the vehicle 10, the focal length f, and the pixel spacing p. The prescribed height may be about 50 [cm], for example.

The image processing unit 1 calculates, in the lower part area $RDD_{k2}$, the distance in the lateral direction between the edge points at the same height constituting the extracted sets B1 and B2 of the edge points, and then calculates an average value a [pixel] of the calculated distances. In this manner, as shown in FIG. 11(a), the average value (width) a is calculated from the lower part area $RDD_{k2}$. This width a is converted to the value in the real space using the distance $Z_{k2}$ of the binarized object $T_{k2}$ in the object area $R_{k2}$ to the vehicle 10, the focal length f, and the pixel spacing p, to obtain a width A in the real space. This width A is the feature value representing the size of the object.

The above-described processing is carried out for the respective images picked up in the process cycles of time k−N+1 to time k, to calculate time series data of the feature value.

Next, in STEP 205, the image processing unit 1 performs processing of determining whether the time series data of the width A calculated shows movement having periodicity. FIG. 11(b) is a graph showing a change over time of the width A. In FIG. 11(b), the horizontal axis represents the image pick-up times, and the vertical axis represents the calculated width A. Specifically, it is determined whether the following conditions (1-a) and (1-b) are satisfied.

(1-a) The image processing unit 1 determines whether the maximum change amount DA of the width A of the object in the real space in the predetermined period of time S falls within a predetermined range $DA_{th1}$ to $DA_{th2}$ ($DA_{th1} \leq DA \leq DA_{th2}$). The range $DA_{th1}$ to $DA_{th2}$ is predetermined as a range of the value the step width of a typical pedestrian may take. For example, $DA_{th1}$ may be 20 [cm] and $DA_{th2}$ may be 60 [cm].

(1-b) The image processing unit 1 determines whether the width A of the object changes with periodicity in the predetermined period of time S. Specifically, the image processing unit 1 obtains an average value Ave from all the data of the width A in the predetermined period of time, and calculates a value A2 by subtracting the average value Ave from the width A (A2=A−Ave). The data indicating which one of (positive, 0, negative) the value A2 takes is shown in FIG. 11(c) in the form of a graph.

In FIG. 11(c), the horizontal axis represents time (s), and the vertical axis represents the data (positive, 0, negative). As shown in FIG. 11(c), the area where the value A2 takes positive values continuously for a predetermined period of time $S_{th1}$ to $S_{th2}$ is regarded as a "positive area", while the area where the value A2 takes negative values continuously for the predetermined period of time $S_{th1}$ to $S_{th2}$ is regarded as a "negative area". The period $S_{th1}$ to $S_{th2}$ is predetermined as a range of the value the cycle of the walking motion of a typical pedestrian may take. For example, $S_{th1}$ may be 0.4 [sec] and $S_{th2}$ may be 0.6 [sec].

In the case where there is at least one of the "positive area" and the "negative area" in the time series data of the feature value in the predetermined period of time S, the image processing unit 1 determines that it changes with periodicity.

When the result of determination in STEP 205 is YES (i.e., when the maximum change amount of the feature value is within the predetermined range and the feature value has periodicity), the process proceeds to STEP 206, where the image processing unit 1 determines that the object is a living body, and terminates the living body determination processing. When the result of determination in STEP 205 is NO, the process proceeds to STEP 207, where the image processing unit 1 determines that the object is not a living body, and terminates the living body determination processing. The processing in STEPS 206 and 207 corresponds to the processing by the living body determination means 14.

The living body determination processing has been described above in detail.

With the above processing, according to the present embodiment, it is possible to accurately determine the type of the object (living body such as a pedestrian) by appropriately determining the periodicity in movement of the object extracted from the picked-up images of the surroundings of the vehicle. This makes it possible to provide the driver of the vehicle 10 with the information or the like as appropriate.

While the case where the object the images of which are picked up is a pedestrian walking across the road has been described above, the present invention may also be applied to the case where the object is a pedestrian walking along the side of the road, or an animal.

Figure 12:
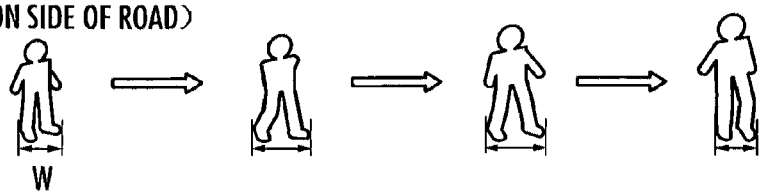
FIG. 12 shows another example of time series images in the living body determination processing in FIG. 6.
Figure 12:
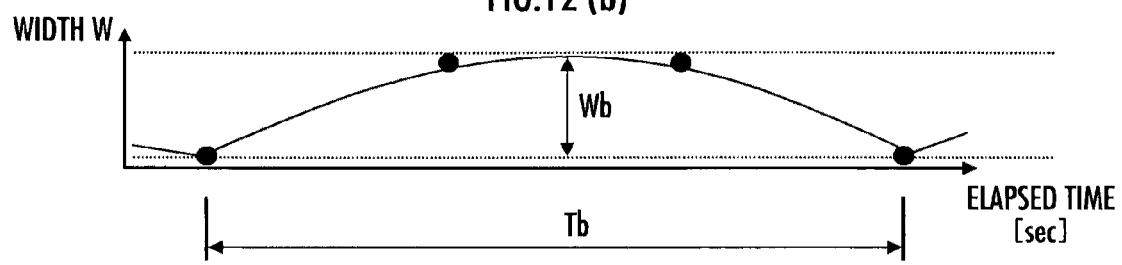
Figure 12:
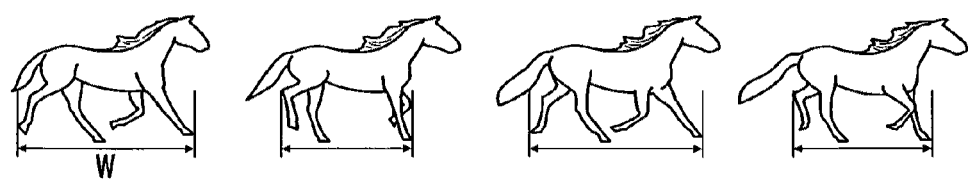
Figure 12:
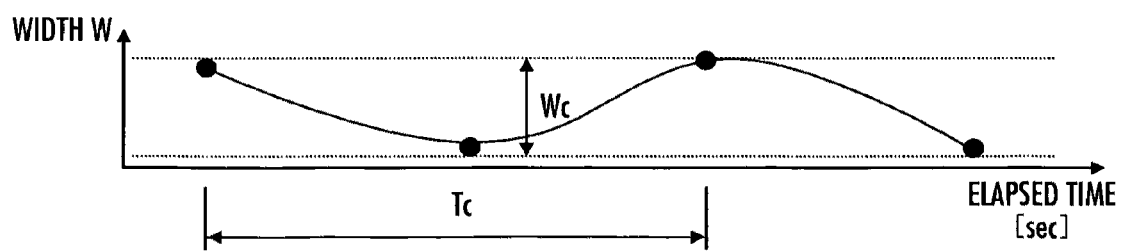

For example, FIG. 12(a) illustrates time series images of a pedestrian picked up in the case where the object is the pedestrian walking along the side of the road. FIG. 12(b) is a graph indicating a change over time of the width W of the legs of the pedestrian illustrated in FIG. 12(a). In FIG. 12(b), the horizontal axis represents an elapsed time, the vertical axis represents the width W, and the values of the width W at times k1 to k4 are indicated by black circles. In the example shown in FIG. 12, the width W changes in a cycle of Tb and with a maximum change amount of Wb. The cycle Tb may be about 0.5 [sec] and the maximum change amount Wb may be about 20 to about 60 [cm], for example.

FIG. 12(c) illustrates time series images of a horse picked up in the case where the horse is walking across the road. FIG. 12(d) is a graph showing a change over time of the width W of the legs of the horse illustrated in FIG. 12(c). In FIG. 12(d), the horizontal axis represents an elapsed time, and the vertical axis represents the width W. In the example shown in FIG. 12, the width W changes in a cycle of Tc and with a maximum change amount of Wc.

As such, the width W would change periodically even in the case where the object is the pedestrian walking along the side of the road or the animal. Thus, the processing similar to the case where the object is the pedestrian walking across the road may be performed, even in the case where the object is the pedestrian walking along the side of the road or the animal, to determine whether the feature value, i.e. the width W, changes with periodicity, thereby ensuring accurate determination of the type of the object.

Further, in the present embodiment, the time tracking in STEP 202 is performed by template matching for the upper part area included in the object area in the gray scale image. Alternatively, the time tracking may be performed using the binarized object's area S, centroid position Gc, aspect ratio ASP and the like, as explained in STEP 9 above.

Second Embodiment

Figure 13:
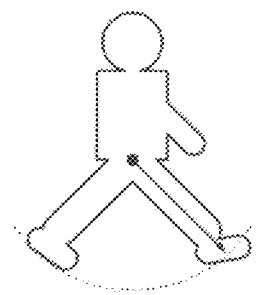
FIG. 13 illustrates the living body determination processing by the object type determination apparatus according to a second embodiment of the present invention.
Figure 13:
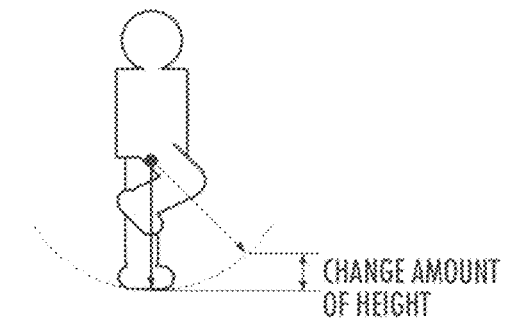
Figure 13:
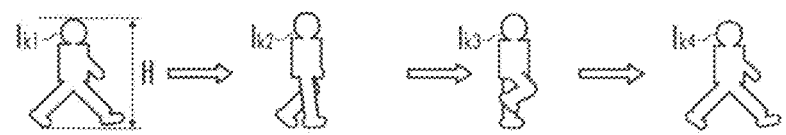
Figure 13:
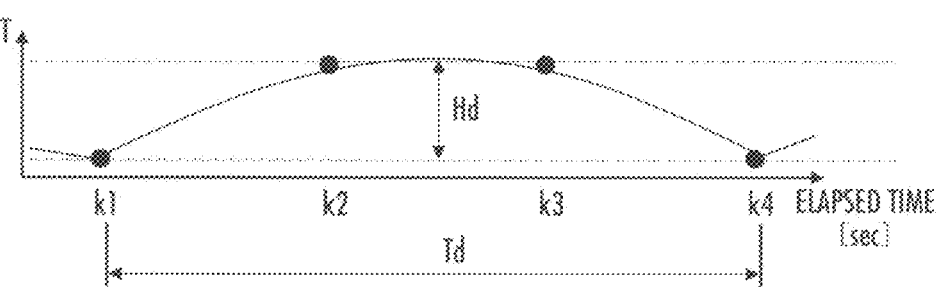
Figure 13:
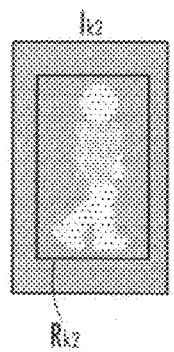
Figure 13:
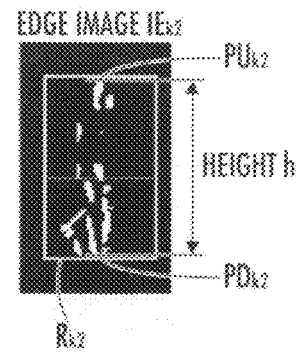

A second embodiment of the present invention will now be described with reference to FIG. 13. FIG. 13 illustrates the living body determination processing in the object type determination apparatus according to the second embodiment. The second embodiment differs from the first embodiment only in the feature value used by the object periodicity determination means 13. In the following, the configuration identical to that of the first embodiment will be denoted by the reference characters identical to those used in the first embodiment, and description thereof will not be repeated.

In the object type determination apparatus of the present embodiment, the object periodicity determination means 13 uses a height of the object as the feature value representing the size of the object. Specifically, as shown in FIG. 13(*a*), the pedestrian walks by rotating the legs with the waist as a fulcrum and, as shown in FIG. 13(*b*), the legs come into contact with the road surface. Thus, the position of the head of the pedestrian with respect to the road surface moves up and down periodically according to the positions of the legs.

Consequently, the height (body height) of the pedestrian would change periodically during the walking motion. It is thus possible to determine whether the object is a living body (pedestrian), using the height of the pedestrian as the feature value, by determining whether it changes with periodicity. The other configuration of the present embodiment is identical to that of the first embodiment.

Hereinafter, an operation of the object type determination apparatus of the present embodiment will be described. The operation of the object type determination apparatus of the present embodiment differs from that of the first embodiment only in the processing in STEPS 203 to 205 in the living body determination processing in FIG. 6. In the following, description of the common processing will not be repeated.

Further, in the following, the case where a pedestrian is walking across the road in front of the vehicle 10 will be described by way of example, as in the first embodiment. The time series images $I_{k1}$ to $I_{k4}$ of the pedestrian picked up at times k1 to k4 are as illustrated in FIG. 13(*c*), similar to those in FIG. 7(*a*) in the first embodiment.

FIG. 13(*d*) is a graph illustrating a change over time of the height H of the pedestrian illustrated in FIG. 13(*c*). In FIG. 13(*d*), the horizontal axis represents an elapsed time, the vertical axis represents the height H, and the values of the height H at times k1 to k4 are indicated by black circles. In the example shown in FIG. 13(*d*), the height H changes in a cycle of Td and with a maximum change amount of Hd. For example, the cycle Td of the change of the height H during the walking motion of the pedestrian may be about 1 [sec], and the maximum change amount Hd of the height H when the walking motion of the pedestrian is seen from a side may be about 4 [cm].

In the living body determination processing in the present embodiment, in STEP 203, the image processing unit 1 extracts an uppermost edge point and a lowermost edge point in an object area as end points, from among the edge points obtained by performing edge extracting processing on the object area. For example, as shown in FIG. 13(*e*), in the case where the object area $R_{k2}$ is extracted for the image $I_{k2}$ (with the luminance level schematically shown in broken color), the uppermost edge point $PU_{k2}$ and the lowermost edge point $PD_{k2}$ are extracted from among the edge points (white portions in the figure of the edge image $IE_{k2}$) included in the object area $R_{k2}$ in the edge image $IE_{k2}$ obtained by performing the edge extracting processing on the image $I_{k2}$.

Next, in STEP 204, the image processing unit 1 calculates a feature value representing the size of the object from the difference between the uppermost edge point and the lowermost edge point. For example, in the case shown in FIG. 13(*e*), the difference (height h [pixel]) between the uppermost edge point $PU_{k2}$ and the lowermost edge point $PD_{k2}$ is calculated. Then, this height h is converted to the value in the real space using the distance $Z_{k2}$ of the binarized object $T_{k2}$ in the object area $R_{k2}$ to the vehicle 10, the focal length f, and the pixel spacing p, to thereby obtain a height H in the real space. This height H is the feature value representing the size of the object.

Next, in STEP 205, the image processing unit 1 performs processing of determining whether the object moves with periodicity, from the time series data of the calculated height H. Specifically, as in the first embodiment, it is determined whether the following conditions (2-a) and (2-b) are satisfied.

(2-a) The image processing unit 1 determines whether the maximum change amount DA of the height H of the object in the real space within the predetermined period of time S falls within a predetermined range $DA_{th1}$ to $DA_{th2}$ ($DA_{th1} \leq DA \leq DA_{th2}$). The range $DA_{th1}$ to $DA_{th2}$ is predetermined as a range of the value the height (body height) of a typical pedestrian may take.

(2-b) The image processing unit 1 determines whether the height H of the object changes with periodicity in the predetermined period of time S, as in the first embodiment.

The other operation of the second embodiment is identical to that of the first embodiment.

With the above processing, according to the present embodiment, as in the first embodiment, it is possible to accurately determine the type of the object (living body such as a pedestrian) by appropriately determining the periodicity in movement of the object extracted from the picked-up images of the surroundings of the vehicle. This makes it possible to provide the driver of the vehicle 10 with the information or the like as appropriate.

Third Embodiment

Figure 14:
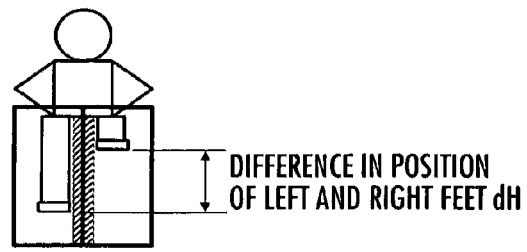
FIG. 14 illustrates the living body determination processing by the object type determination apparatus according to a third embodiment of the present invention.
Figure 14:
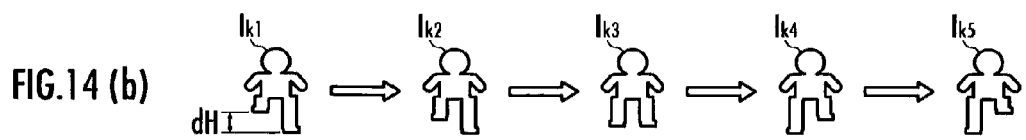
Figure 14:
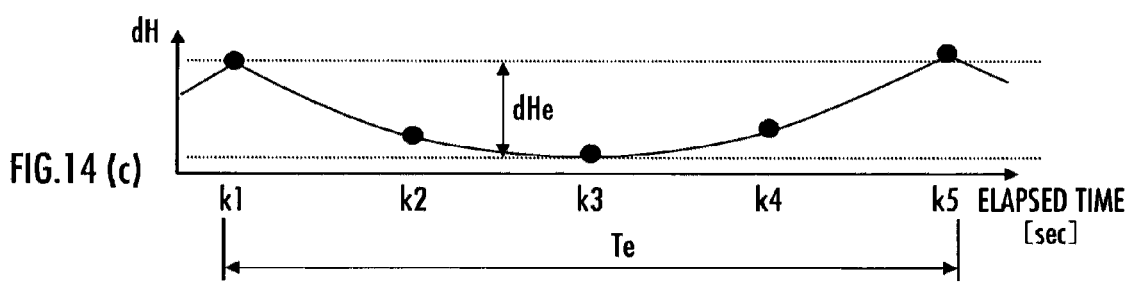
Figure 15:
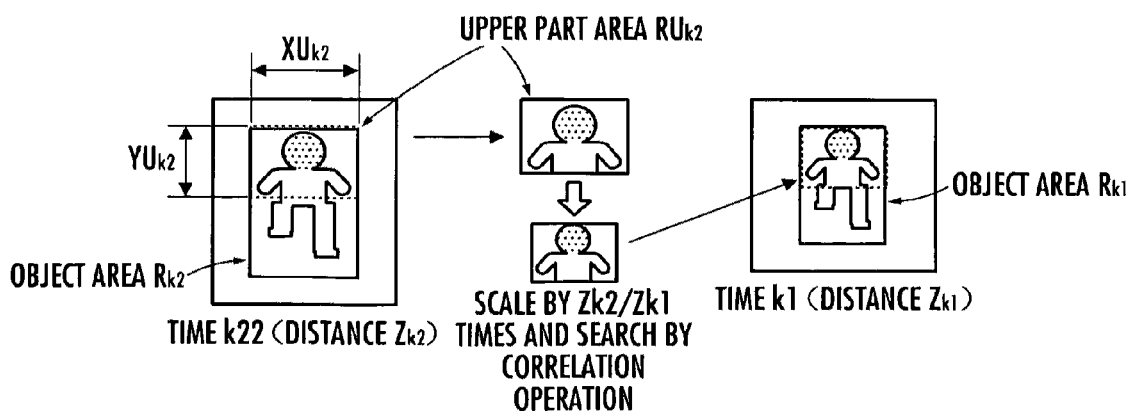
FIG. 15 illustrates processing of tracking an object over time in the living body determination processing shown in FIG. 14.
Figure 16:
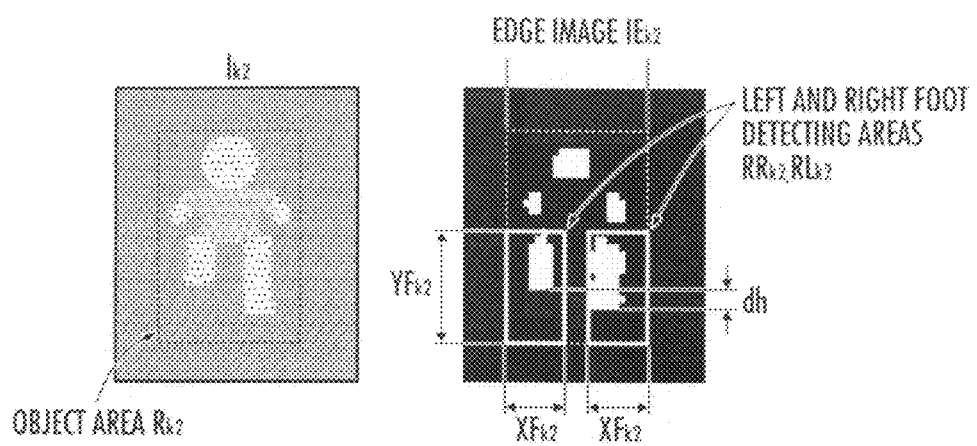
FIG. 16 illustrates the processing of determining periodicity in the living body determination processing in FIG. 14.
Figure 16:
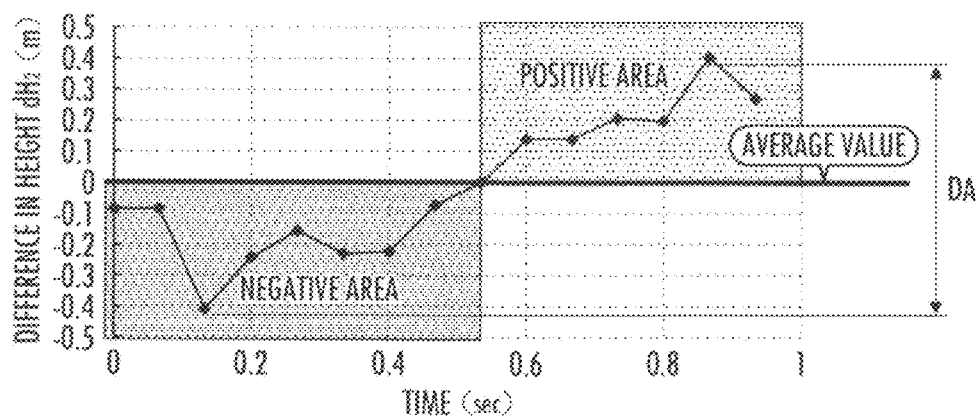

A third embodiment of the present invention will now be described with reference to FIGS. 14 to 16. FIGS. 14 to 16 illustrate the living body determination processing in the object type determination apparatus of the present embodiment. The present embodiment differs from the first embodiment in that a second specific site extracting means 16 is provided, and also differs in the feature value used by the object periodicity determination means 13. In the following, the configuration identical to that of the first embodiment will be denoted by the identical reference characters, and description thereof will not be repeated.

The object type determination apparatus of the present embodiment includes the second specific site extracting means 16 which extracts a set of specific sites of the object from the area of the object extracted by the object area extracting means 11. In the case where the object is a human being, for example, the set of specific sites may be specific sites making a pair, such as the arms, legs, or feet of the body. In the present embodiment, the legs are extracted as the set of specific sites.

The object end point extracting means 12 extracts end points of the specific sites of the object extracted by the second specific site extracting means 16. Specifically, the object end point extracting means 12 performs edge extracting processing on the image portions of the specific sites of the object in the gray scale image to extract edge points, and extracts end points for calculation of the feature value from the extracted edge points.

Further, the object periodicity determination means 13 uses a difference in height of a pair of specific sites of the object as the feature value representing the size of the object. Specifically, the difference in height of the left and right feet is used. That is, for example in the case where the object is a bicycle rider, in order for the bicycle to run, the rider needs to work the pedals of the bicycle alternately to cause circular movement of the pedals by the crank.

This means that the left and right feet of the bicycle rider move up and down periodically during the running of the bicycle. Thus, as shown e.g. in FIG. 14(*a*), the difference in height of the left and right feet (the difference in height of the lower ends of the left and right feet) may be used as the feature value to determine whether it changes with periodicity, to thereby determine whether the object is a living body (bicycle rider). The other configuration is identical to that of the first embodiment.

Hereinafter, an operation of the object type determination apparatus of the present embodiment will be described. The operation of the object type determination apparatus of the present embodiment differs from that of the first embodiment only in the processing in STEPS 203 to 205 in the living body determination processing in FIG. 6. In the following, description of the common processing will not be repeated.

Further, in the following, description will be made about the case where the bicycle is traveling opposing the vehicle 10 along the side of the road in front of the vehicle 10. FIG. 14(*b*) illustrates time series images $I_{k1}$ to $I_{k5}$ of the bicycle rider picked up at times k1 to k5. FIG. 14(*c*) is a graph indicating a change over time of a difference dH in height between the lower ends of the left and right feet of the bicycle rider illustrated in FIG. 14(*b*). In FIG. 14(*c*), the horizontal axis represents an elapsed time, the vertical axis represents a difference in height dH, and the values of the difference in height dH at times k1 to k5 are indicated by black circles. In the example shown in FIG. 14(*c*), the difference in height dH changes in a cycle of Te and with a maximum change amount of dHe. The cycle Te may be about 1 [sec], and the maximum change amount dHe may be about 40 [cm], for example.

In the living body determination processing of the present embodiment, in STEP 202, the image processing unit 1 performs time tracking of the object, as in the first embodiment. FIG. 15 shows by way of example the case where time tracking of the object is carried out between the image $I_{k1}$ picked up at time k1 and the image $I_{k2}$ picked up at time k2 shown in FIG. 14(*b*). In this case, the upper part area $RU_{k2}$ is the area corresponding to the upper body part of the bicycle rider. Because the upper body part of the bicycle rider moves in a relatively small amount, similarly as in the case of the pedestrian, performing the template matching using the upper part area in the object area as the search image (template) ensures accurate time tracking of the object.

Next, in STEP 203 of the present embodiment, the image processing unit 1 firstly extracts left and right foot detecting areas from the object area (which corresponds to the processing by the second specific site extracting means 16). For example, in the case where the object area $R_{k2}$ is extracted for the image $I_{k2}$ (with the luminance level schematically shown in broken color) as shown in FIG. 16(*a*), the right foot detecting area $RR_{k2}$ and the left foot detecting area $RL_{k2}$ each having a width $XF_{k2}$ and a height $YF_{k2}$ are set in the object area $R_{k2}$. The width $XF_{k2}$ and the height $YF_{k2}$ are set, based on prescribed values predetermined as the range where the left and right feet of the bicycle rider in the real space can be detected, by converting them to the values in the image space using the distance $Z_{k2}$ of the binarized object $T_{k2}$ in the object area $R_{k2}$ to the vehicle 10, the focal length f, and the pixel pitch p.

Next, the image processing unit 1 performs edge extracting processing on each of the left and right foot detecting areas $RR_{k2}$ and $RL_{k2}$, to extract edge points. The image processing unit 1 then extracts the lowermost edge point from among the edge points extracted in a respective one of the left and right foot detecting areas $RR_{k2}$ and $RL_{k2}$, as the end points of the image portion of the object (which corresponds to the processing of the object end point extracting means 12). For example, as shown in FIG. 16(*a*), in the edge image $IE_{k2}$ indicating the edge points (white portions in the figure of the edge image $IE_{k2}$) obtained by performing the edge extracting processing on the image $I_{k2}$, the lowermost edge points from among the edge points included in the left and right foot detecting areas $RR_{k2}$ and $RL_{k2}$ are extracted as the end points of the object.

Next, in STEP 204, the image processing unit 1 calculates a difference in height, dh [pixel], of the extracted lowermost edge points. FIG. 16(*a*) shows the difference in height dh thus obtained. The image processing unit 1 then converts the calculated difference in height dh to the difference in height dH [m] in the real space, using the distance $Z_{k2}$ of the binarized object $T_{k2}$ in the object area $R_{k2}$ to the vehicle 10, the focal length f, and the pixel spacing p. This difference in height dH is the feature value representing the size of the object.

Next, in STEP 205, the image processing unit 1 performs processing of determining whether the movement of the object shows periodicity, from the time series data of the calculated difference in height dH. Specifically, it determines whether the following conditions (3-a) and (3-b) are satisfied.

(3-a) The image processing unit 1 determines whether the maximum change amount DA of the height difference dH in the real space within the predetermined period of time S falls within a predetermined range $DA_{th1}$ to $DA_{th2}$ ($DA_{th1} \leq DA \leq DA_{th2}$). The range $DA_{th1}$ to $DA_{th2}$ is predetermined as a range of the value the difference in height between the left and right feet of a typical bicycle rider may take. For example, $DA_{th1}$ may be 30 [cm] and $DA_{th2}$ may be 80 [cm].

(3-b) The image processing unit 1 determines whether the height difference dH of the object changes with periodicity in the predetermined period of time S. Specifically, the image processing unit 1 obtains an average value Ave from all the data of the height difference dH in the predetermined period of time S, and calculates a value dH2 by subtracting the average value Ave from the height difference dH (dH2=dH−Ave). In this manner, the value dH2 as shown by the graph in FIG. 16(*b*) is obtained. In FIG. 16(*b*), the horizontal axis represents time [sec] and the vertical axis represents the value dH2.

As shown in FIG. 16(b), the area where the value dH2 takes positive values continuously for a predetermined period of time $S_{th1}$ to $S_{th2}$ is regarded as a "positive area", while the area where the value dH2 takes negative values continuously for the predetermined period of time $S_{th1}$ to $S_{th2}$ is regarded as a "negative area". The period $S_{th1}$ to $S_{th2}$ is predetermined as a range of the value the cycle of the walking motion of a typical bicycle rider may take. For example, $S_{th1}$ may be 0.4 [sec] and $S_{th2}$ may be 0.6 [sec].

In the case where there is at least one of the "positive area" and the "negative area" in the time series data of the feature value in the predetermined period of time S, the image processing unit 1 determines that it changes with periodicity.

The other operation is identical to that of the first embodiment.

With the above processing, according to the present embodiment, as in the first embodiment, it is possible to accurately determine the type of the object (living body such as a bicycle rider) by appropriately determining the periodicity in movement of the object extracted from the picked-up images of the surroundings of the vehicle. This ensures that the driver of the vehicle 10 is appropriately provided with the information or the like.

Fourth Embodiment

A fourth embodiment of the present invention will now be described. The present embodiment differs from the third embodiment in that the second specific site extracting means 16 is replaced with a first specific site extracting means 15, and also differs in the feature value used by the object periodicity determination means 13. In the following, the configuration identical to that of the third embodiment will be denoted by the identical reference characters, and description thereof will not be repeated.

The object type determination apparatus of the present embodiment is provided with a first specific site extracting means 15 which extracts a specific site of the object from an area of the object extracted by the object area extracting means 11. The specific site specifically refers to an arm, leg, foot or other site of the body when the object is a human being. In the present embodiment, one of the left and right feet is extracted as the specific site.

The object end point extracting means 12 extracts an end point of the specific site of the object extracted by the first specific site extracting means 15. Specifically, the object end point extracting means 12 performs edge extracting processing on the image portion of the specific site of the object in the gray scale image to extract edge points, and extracts an end point from among the extracted edge points.

Further, the object periodicity determination means 13 uses a height of the specific site of the object as the feature value representing the size of the object. Specifically, it uses the height of one of the feet. For example, in the case where the object is a bicycle rider, the left and right feet of the bicycle rider move up and down periodically during the traveling of the bicycle, as explained in the third embodiment. Thus, it is possible to determine whether the object is a living body (bicycle rider) by using the height of one of the left and right feet (the height of the lower end of the foot) as the feature value to determine whether it changes with periodicity. The other configuration is identical to that of the third embodiment.

Hereinafter, an operation of the object type determination apparatus of the present embodiment will be described. The operation of the object type determination apparatus of the present embodiment differs from that of the third embodiment only in the processing in STEPS 203 to 205 in the living body determination processing shown in FIG. 6. In the following, description of the common processing will not be repeated.

In STEP 203 of the living body determination processing of the present embodiment, the image processing unit 1 firstly extracts a foot detecting area corresponding to one of the left and right feet from the object area (this corresponds to the processing by the first specific site extracting means 15). For example, in the case shown in FIG. 16(a), a right foot detecting area $RR_{k2}$ having a width $XF_{k2}$ and a height $YF_{k2}$ alone is set in the object area $R_{k2}$ in the present embodiment.

Next, the image processing unit 1 performs the edge extracting processing on the right foot detecting area $RR_{k2}$ to extract edge points. The image processing unit 1 then extracts the lowermost edge point from among the edge points extracted in the right foot detecting area $RR_{k2}$, as an end point of the object (this corresponds to the processing by the object end point extracting means 12).

Next, in STEP 204, the image processing unit 1 calculates a height hr [pixel] of the extracted lowermost edge point. It then converts the calculated height hr to a height Hr [m] in the real space, using the distance $Z_{k2}$ of the binarized object $T_{k2}$ in the object area $R_{k2}$ to the vehicle 10, the focal length f, and the pixel pitch p.

Next, in STEP 205, the image processing unit 1 determines whether the movement of the object shows periodicity, from the time series data of the calculated height Hr. Specifically, it determines whether the following conditions (4-a) and (4-b) are satisfied.

(4-a) The image processing unit 1 determines whether the maximum change amount DA of the height Hr in the real space within the predetermined period of time falls within a predetermined range $DA_{th1}$ to $DA_{th2}$ ($DA_{th1} \leq DA \leq DA_{th2}$). The range is predetermined as a range of the value the height of one of the left and right feet of a typical bicycle rider may take. For example, $DA_{th1}$ may be 30 [cm] and $DA_{th2}$ may be 80 [cm].

(4-b) The image processing unit 1 determines whether the height Hr of the foot of the object changes with periodicity in the predetermined period of time S, as in the third embodiment.

The other operation in the present embodiment is identical to that in the third embodiment.

With the processing described above, according to the present embodiment, as in the third embodiment, it is possible to accurately determine the type of the object (living body such as a bicycle rider) by appropriately determining the periodicity in movement of the object extracted from the picked-up images of the surroundings of the vehicle. This ensures that the information is provided to the driver of the vehicle 10 as appropriate.

Fifth Embodiment

A fifth embodiment of the present invention will now be described. The present embodiment differs from the first embodiment in that both the first specific site extracting means 15 and the second specific site extracting means 16 are provided, and also differs in the feature values and determination conditions used by the object periodicity determination means 13. Specifically, in the present embodiment, the object periodicity determination means 13 uses the feature values and the determination conditions of the first through fourth embodiments in combination in the living body determination processing. In the following, the configuration identical to that of the first embodiment will be denoted by the identical reference characters, and description thereof will not be repeated.

The object type determination apparatus of the present embodiment includes the second specific site extracting means 16 as in the third embodiment and the first specific site extracting means 15 as in the fourth embodiment. The object end point extracting means 12 extracts an end point of the image portion of the object from the object area extracted by the object area extracting means 11, and also extracts an end point of a specific site of the object extracted by the first specific site extracting means 15 and end points of a pair of specific sites of the object extracted by the second specific site extracting means 16.

The object periodicity determination means 13 uses at least one feature value (four in the present embodiment) as the feature value representing the size of the object. Specifically, the width of the object in the lower part area in the object area, as in the first embodiment, is used as a first feature value; the height of the object, as in the second embodiment, is used as a second feature value; the difference in height of a pair of specific sites of the object, as in the third embodiment, is used as a third feature value; and the height of a specific site of the object, as in the fourth embodiment, is used as a fourth feature value.

Further, the object periodicity determination means 13 has at least one determination condition (four in the present embodiment), and in the case where the result of determination using at least a predetermined number of (one in the present embodiment) determination condition among the determination conditions indicate that the feature value changes with periodicity, it determines that the feature value has periodicity. Specifically, the first through fourth determination conditions using the first through fourth feature values, respectively, are used. The other configuration of the present embodiment is identical to that of the first embodiment.

An operation of the object type determination apparatus of the present embodiment will now be described. The operation of the object type determination apparatus of the present embodiment differs from that of the first embodiment only in the processing in STEPS 203 to 205 in the living body determination processing shown in FIG. 6. In the following, description of the common processing will not be repeated.

In STEP 203 of the living body determination processing in the present embodiment, the image processing unit 1 extracts, as an end point, an edge point satisfying a predetermined condition from among the edge points obtained by performing the edge extracting processing on the object area, as in the first embodiment. Further, the image processing unit 1 extracts, as end points, the uppermost edge point and the lowermost edge point in the object area from among the edge points obtained by performing the edge extracting processing on the object area, as in the second embodiment.

Furthermore, the image processing unit 1 extracts left and right foot detecting areas, and extracts the lowermost edge points among the edge points obtained by performing the edge extracting processing on the left and right foot detecting areas as the end points of the image portion of the object, as in the third embodiment. Still further, the image processing unit 1 extracts one of the left and right foot detecting areas (right one in the present embodiment), and extracts the lowermost edge point from among the edge points obtained by performing the edge extracting processing on the right foot detecting area RR as the end point of the object, as in the fourth embodiment.

Next, in STEP 204, the image processing unit 1 calculates a width W of the object in the lower part area in the object area as the first feature value, as in the first embodiment. Further, the image processing unit 1 calculates a height H of the object as the second feature value, as in the second embodiment. The image processing unit 1 further calculates a difference in height, dH, of the left and right feet of the object as the third feature value, as in the third embodiment. Still further, the image processing unit 1 calculates a height Hr of the right foot of the object as the fourth feature value, as in the fourth embodiment. It then calculates the time series data of the first to fourth feature values.

Next, in STEP 205, the image processing unit 1 determines whether the movement of the object shows periodicity, based on the calculated first to fourth feature values, from their time series data. Specifically, the image processing unit 1 determines that the feature value has periodicity in the case where the result of determination using at least one of the following first through fourth determination conditions (5-a) to (5-d) indicates that the feature value changes with periodicity (i.e., the condition is satisfied).

(5-a) First determination condition: Determine whether the first feature value satisfies the conditions (1-a) and (1-b), as in the first embodiment.

(5-b) Second determination condition: Determine whether the second feature value satisfies the conditions (2-a) and (2-b), as in the second embodiment.

(5-c) Third determination condition: Determine whether the third feature value satisfies the conditions (3-a) and (3-b), as in the third embodiment.

(5-d) Fourth determination condition: Determine whether the fourth feature value satisfies the conditions (4-a) and (4-b), as in the fourth embodiment.

The other operation in the present embodiment is identical to that in the first embodiment.

With the processing described above, according to the present embodiment, as in the first through fourth embodiments, it is possible to accurately determine the type of the object (living body such as a bicycle rider) by appropriately determining the periodicity in movement of the object extracted from the picked-up images of the surroundings of the vehicle. Accordingly, the driver of the vehicle 10 is appropriately provided with information or the like. Particularly in the present embodiment, having a plurality of determination conditions makes it possible to carry out determination corresponding to various situations of the object, and accordingly, it is possible to accurately determine the type of the object by appropriately determining the periodicity in movement of the object, irrespective of the situations of the object.

While the object periodicity determination means 13 of the present embodiment uses four determination conditions, the number of determination conditions may be changed as appropriate.

Further, while the object periodicity determination means 13 of the present embodiment determines that there is a periodicity in the case where at least one (predetermined number) of the four determination conditions is satisfied, the predetermined number may be changed as appropriate. For example, it may be configured to determine that there is a periodicity when at least two or three determination conditions are satisfied.

Sixth Embodiment

Figure 17:
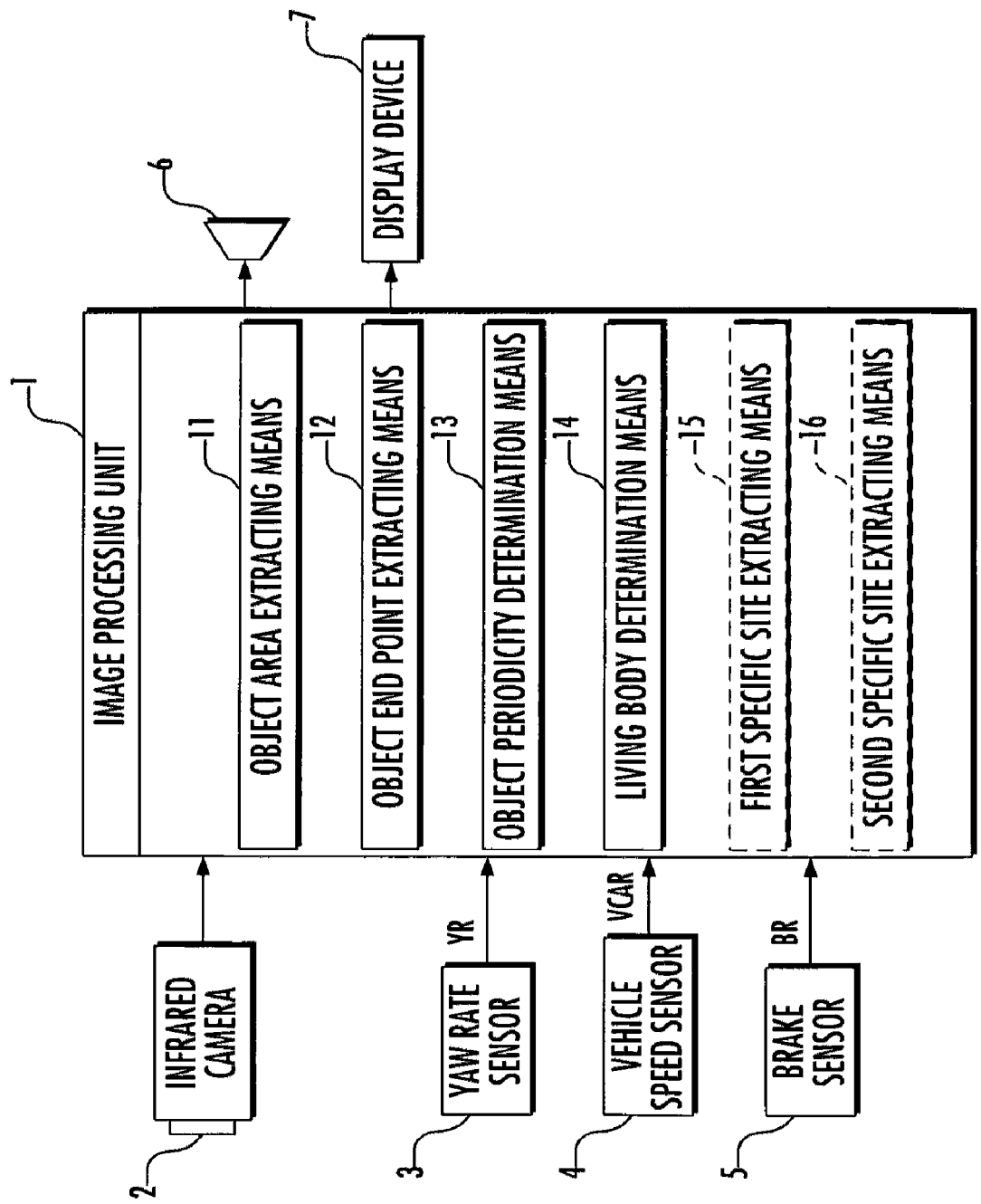
FIG. 17 is a functional block diagram of the object type determination apparatus according to a sixth embodiment of the present invention.
Figure 18:
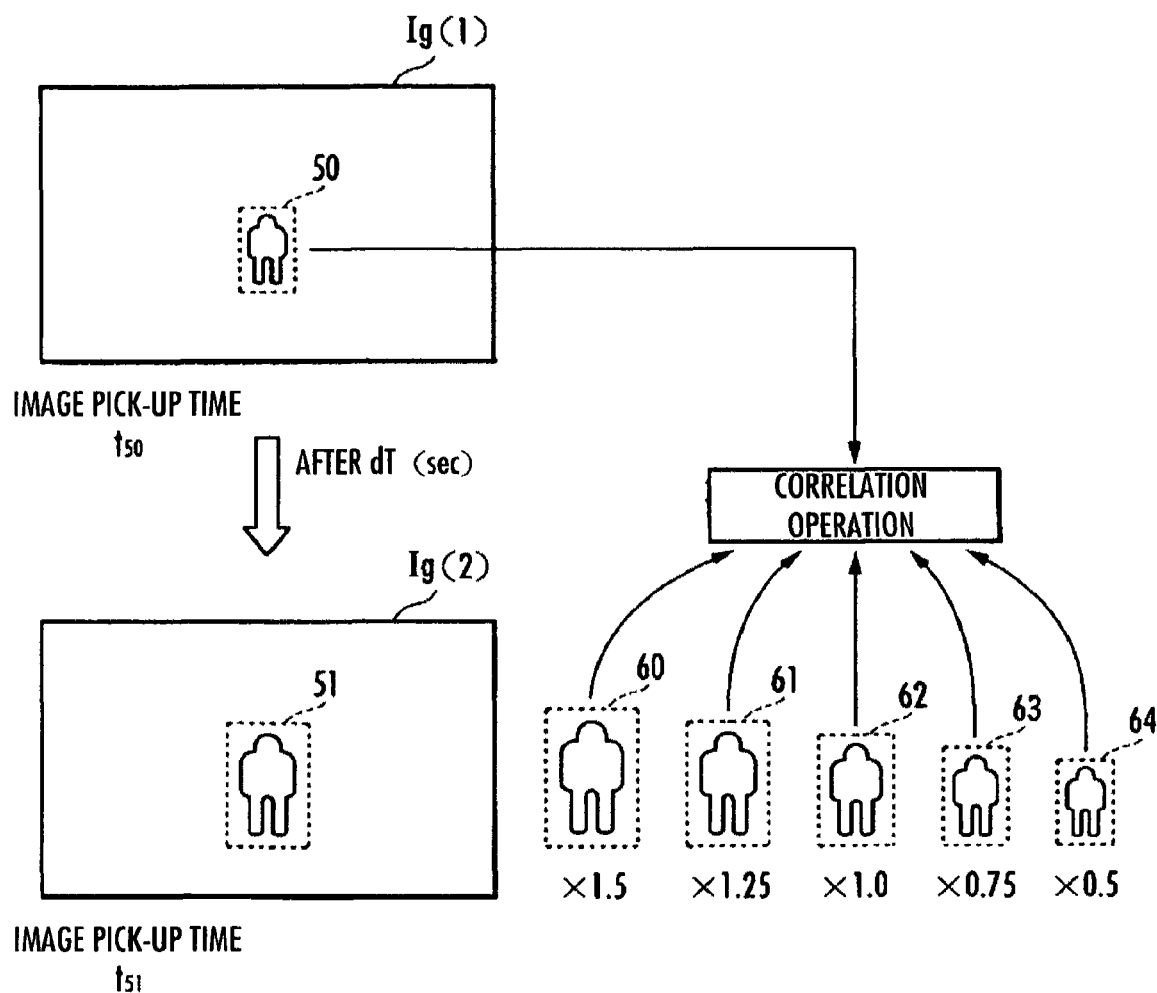
FIG. 18 illustrates processing of calculating a change rate in size of an object by a correlation operation of the time series images, in the object type determination apparatus shown in FIG. 17.
Figure 19:
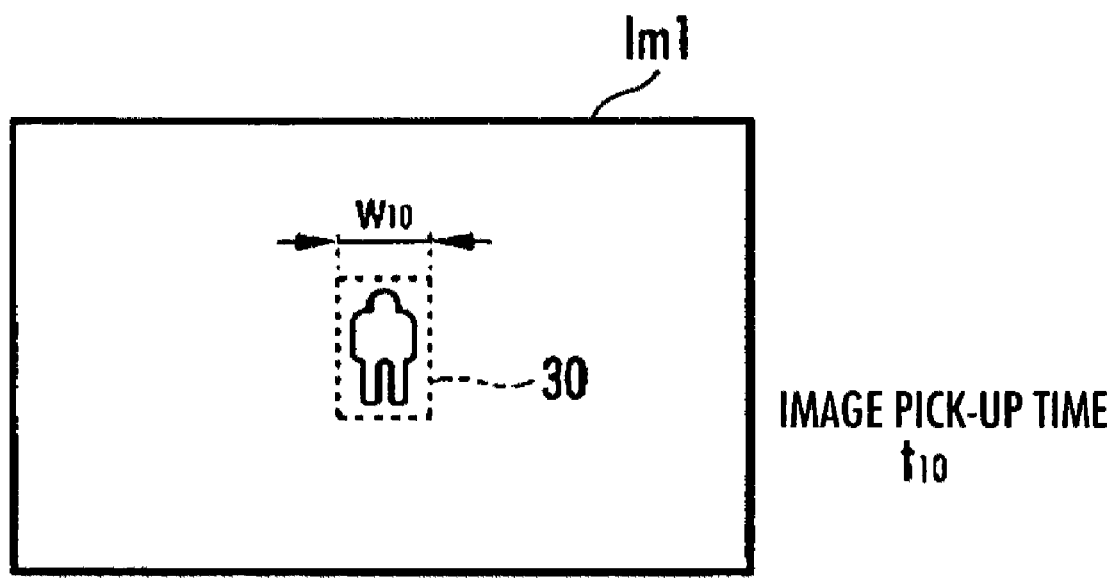
FIG. 19 illustrates processing of calculating a distance of an object to the vehicle in the object type determination apparatus shown in FIG. 17.
Figure 19:
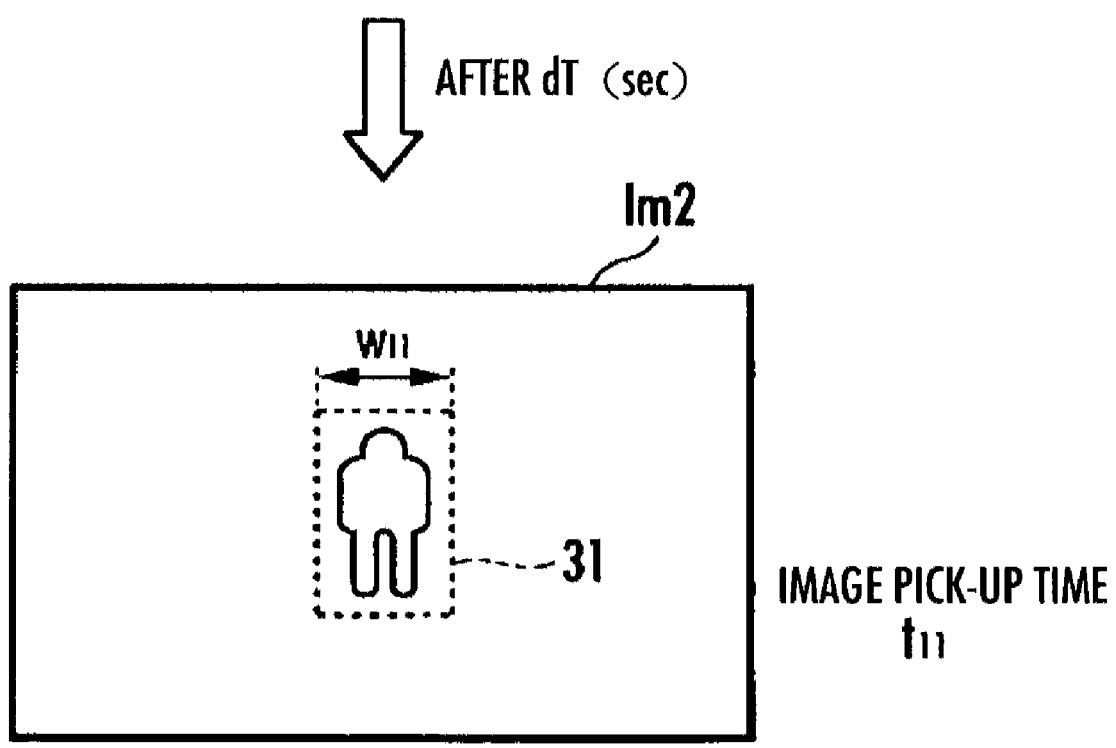
Figure 20:
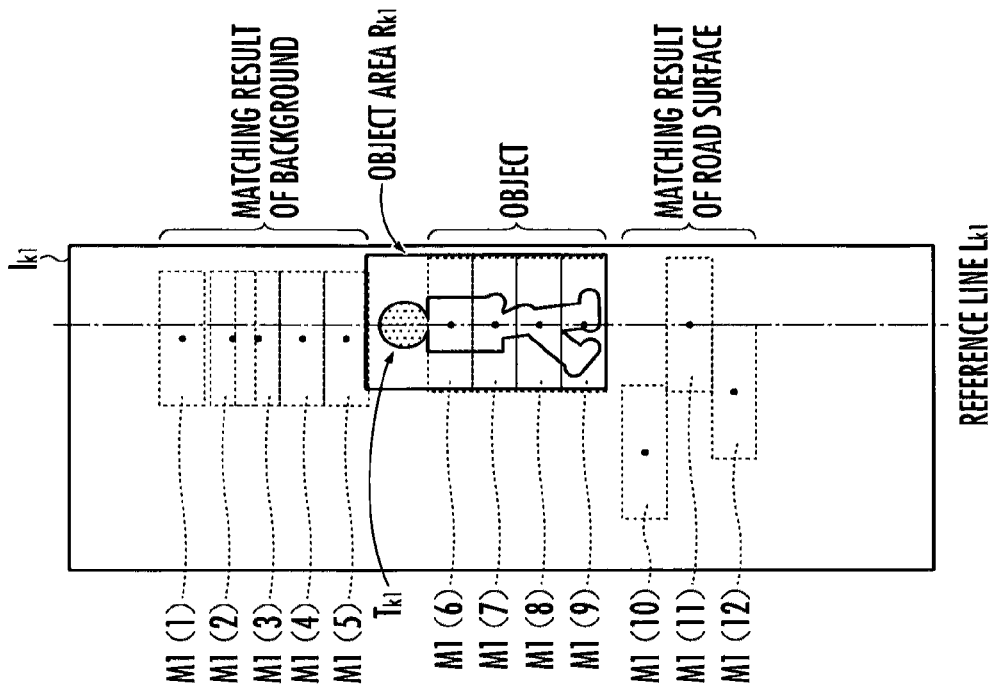
FIG. 20 illustrates object area extracting processing in the object type determination apparatus shown in FIG. 17.
Figure 20:
Figure 20:
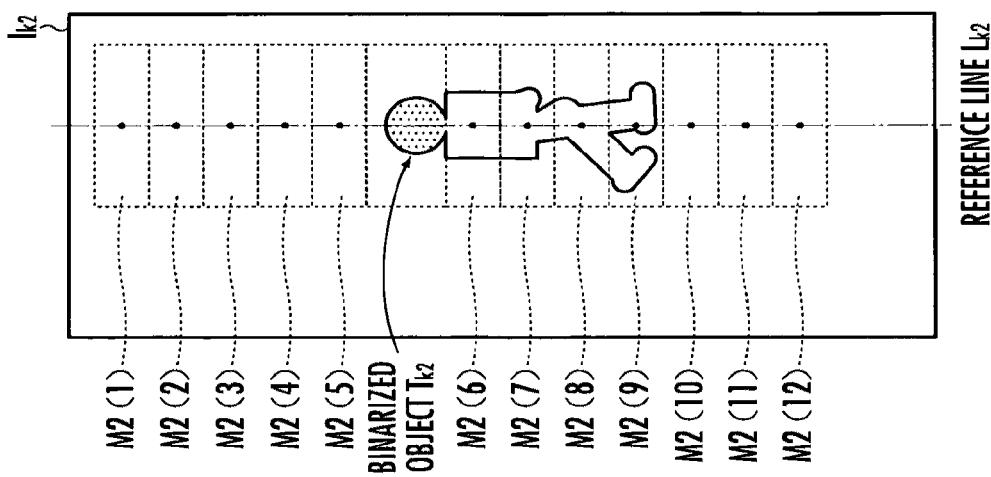

A sixth embodiment of the present invention will now be described with reference to FIGS. 17 to 20. FIG. 17 is a functional block diagram of the object type determination apparatus of the present embodiment, and FIGS. 18 to 20 illustrate the object area extracting processing in the living body determination processing of the object type determination apparatus of the present embodiment. The present embodiment differs from the first embodiment in that it is provided with a single infrared camera 2 instead of the two infrared cameras 2R and 2L. In the following, the configuration identical to that of the first embodiment will be denoted by the identical reference characters, and description thereof will not be repeated.

In the present embodiment, the infrared camera 2 is mounted on the front portion of the vehicle 10 to pick up images in front of the vehicle 10. The infrared camera 2 corresponds to the image pick-up means of the present invention.

The image processing unit 1 calculates a distance of an object to the vehicle 10 from the images picked up by the infrared camera 2. Specifically, the image processing unit 1 calculates the distance of the object based on a change rate Rate of the size of the image portion of a prescribed object in a plurality of images picked up by the infrared camera 2 at different times, and the traveling distance of the vehicle 10 which is calculated from time and vehicle speed.

Further, in the image processing unit 1, the object area extracting means 11 extracts an area of an object present in the vicinity of the vehicle 10, from the images picked up by the infrared camera 2. Specifically, the object area extracting means 11 performs binarization processing and labeling processing on the images picked up by the infrared camera 2, to extract an image portion of the object (i.e., a binarized object). Then, the object area extracting means 11 extracts an image portion of the object in the gray scale image, based on the extracted binarized object, as the area of the object.

At this time, in the present embodiment, the object area extracting means 11 sets a plurality of mask areas for the image area in the vertical direction of the binarized object, in each of two images picked up at different times. The object area extracting means 11 then performs a correlation operation for each pair of mask areas set in the corresponding positions in the two images, to extract the area of the object. The other configuration of the present embodiment is identical to that of the first embodiment.

Hereinafter, an operation of the object type determination apparatus of the present embodiment will be described. The object detecting and alerting operations of the object type determination apparatus of the present embodiment differ from those of the first embodiment only in the processing of calculating the distance of the object in STEPS 11 to 14 in FIG. 3 and the processing of extracting the object area in STEP 201 in the living body determination processing in FIG. 6.

In the present embodiment, the image processing unit 1 calculates a distance z of the object to the vehicle 10 using only the images obtained by the infrared camera 2, rather than performing STEPS 11 to 14 described above.

Specifically, the image processing unit 1 firstly calculates a change rate Rate in size of image portions of a prescribed object in a plurality of images picked up by the infrared camera 2 at different times.

Here, a way of calculating the change rate Rate in size of the image portion of the object will be described with reference to FIG. 18. FIG. 18 shows a binarized object 50 in the gray scale image Ig(1) at time $t_{50}$ and a binarized object 51 in the gray scale image Ig(2) at time $t_{51}$ (the image pick-up time in the process cycle following the process cycle corresponding to time $t_{50}$). In the following, description will be made about the case of calculating the change rate Rate in size between the binarized object in the gray scale Ig(1) and that in the gray scale Ig(2).

The image processing unit 1 reduces the size of the binarized object 51 (when the object is approaching the vehicle 10) or increases the size of the binarized object 51 (when the object is moving away from the vehicle 10) in the gray scale image Ig(2) at time $t_{51}$ by affine transformation, to calculate the degree of correlation with the binarized object 50 in the gray scale image Ig(1) at time $t_{50}$. Specifically, as shown in FIG. 18, the degree of correlation with the binarized object 50 in the gray scale image Ig(1) is calculated for each of an image 60 scaled to 1.5 times the size of the binarized object 51, an image 61 scaled to 1.25 times, an image 62 scaled to 1.0 times, an image 63 scaled to 0.75 times, and an image 64 scaled to 0.5 times. The image processing unit 1 then determines the scaling factor of the binarized object 51 when the degree of correlation becomes highest as the change rate Rate.

Next, the image processing unit 1 uses the change rate Rate to calculate the distance z of the object to the vehicle 10.

Here, a way of calculating the distance z of the object to the vehicle 10 using the change rate Rate will be described with reference to FIG. 19.

FIG. 19 shows an image Im1 picked up by the infrared camera 2 at image pick-up time $t_{10}$ and an image Im2 picked up by the infrared camera 2 at image pick-up time $t_{11}$ after a lapse of time dT from time $t_{10}$.

The image Im1 includes an image portion 30 of a pedestrian as the object, and the image Im2 includes an image portion 31 of the same pedestrian as the object. FIG. 19 shows the situation where the pedestrian is walking toward the vehicle 10, and the pedestrian is closer to the vehicle 10 at time $t_{11}$ when the image Im2 was picked up than at time $t_{10}$ when the image Im1 was picked up. Accordingly, the width $w_{11}$ of the image portion 31 of the pedestrian in the image Im2 is wider than the width $w_{10}$ of the image portion 30 of the pedestrian in the image Im1.

At this time, the change rate Rate and the distance $Z_1$ from the vehicle 10 to the object at the current image pick-up time ($t_{11}$) has the relationship represented by the following expression (4).

$$\text{Rate} = \frac{w_{10}(\text{previous})}{w_{11}(\text{current})} \quad (4)$$

$$= \frac{f \cdot W / Z_0}{f \cdot W / Z_1}$$

$$= \frac{Z_1}{Z_0}$$

$$= \frac{Z_1}{Z_1 + Vs \cdot dT}$$

In the expression, $w_{11}$ represents the width of the image portion of the object at the current image pick-up time ($t_{11}$), $w_{10}$ represents the width of the image portion of the object at the previous image pick-up time ($t_{10}$), f represents a focal length of the infrared camera 2, W represents the width of the object in the real space, $Z_1$ represents the distance from the vehicle 10 to the object at the current image pick-up time ($t_{11}$), $Z_0$ represents the distance from the vehicle 10 to the object at the previous image pick-up time ($t_{10}$), Vs represents the relative speed between the vehicle 10 and the object, and dT represents an interval between the image pick-up times.

At this time, the image processing unit 1 calculates the distance $Z_1$ to the object at the current time according to the following expression (5). The expression (5) is a transformed version of the above expression (4) in which the relative speed Vs between the vehicle 10 and the object (=traveling speed Vj of the vehicle+moving speed Vd of the object) is replaced with the traveling speed Vj of the vehicle 10, considering that the speed Vj of the vehicle 10 is sufficiently faster than the moving speed Vd of the object.

$$Z_1 = \frac{\text{Rate} \cdot Vj \cdot dT}{1 - \text{Rate}} \quad (5)$$

In the expression, $Z_1$ represents the distance to the object at the current time, Rate represents the change rate, Vj represents the traveling speed of the vehicle, and dT represents an interval between the image pick-up times.

Further, the image processing unit 1 calculates the distance $Z_0$ to the object at the previous image pick-up time according to the following expression (6).

$$Z_0 = Z_1 + Vj \cdot dT \quad (6)$$

In the expression, $Z_0$ represents the distance to the object at the previous image pick-up time, $Z_1$ represents the distance to the object at the current image pick-up time, Vj represents the traveling speed of the vehicle, and dT represents an interval between the image pick-up times.

As such, the image processing unit 1 calculates the distance $Z_1$ from the vehicle 10 to the object at the current image pick-up time and the distance $Z_0$ from the vehicle 10 to the object at the previous image pick-up time using the above expressions (5) and (6).

Then, using the calculated distance z ($=Z_1$), the image processing unit 1 converts the coordinates (x, y) in the image and the distance $Z_1$ to the real space coordinates, as in the first embodiment, to calculate the real space position corresponding to the position (relative to the vehicle 10) of each object in the real space. These distances $Z_1$ and $Z_0$ are used as the distance of the object in the living body determination processing in FIG. 6.

Next, the processing of extracting the area of the object in STEP 201 in the present embodiment will be described. In the following, the case of extracting the object area $R_{k1}$ at time k1 using the images $I_{k1}$ and $I_{k2}$ picked up at times k1 and k2, respectively, as shown in FIGS. 20(a) and 20(b) will be described by way of example.

Firstly, the image processing unit 1 performs binarization processing and labeling processing on the images $I_{k1}$ and $I_{k2}$ picked up by the infrared camera 2 to extract binarized objects $T_{k1}$ and $T_{k2}$. The vertical lines passing through the centroid positions of the binarized objects $T_{k1}$ and $T_{k2}$ are used as reference lines $L_{k1}$ and $L_{k2}$, respectively.

Next, the image processing unit 1 sets a plurality of mask areas M2(1) to M2(12) in the vertical direction of the binarized object $T_{k2}$ in the image $I_{k2}$, with the reference line $L_{k2}$ defining the central position in the lateral direction of each mask area. FIG. 20(a) shows the mask areas M2(1) to M2(12) thus set. Next, the image processing unit 1 carries out a correlation operation in the image $I_{k2}$ using the mask areas M2(1) to M2(12) as the search images, as in the above-described STEP 11, to extract mask areas M1(1) to M1(12) corresponding to the search images. FIG. 20(b) shows the result of pattern matching. The mask areas M1(6) to M1(9) correspond to the object, the mask areas M1(1) to M1(5) correspond to the background, and the mask areas M1(10) to M1(12) correspond to the road surface.

Next, for each of the mask areas M1(1) to M1(12) extracted in the image $I_{k1}$, the image processing unit 1 calculates the amount of displacement D of the centroid position with respect to the reference line $L_{k1}$. The image processing unit 1 then extracts the area where the calculated displacement amount D is smaller than a threshold value TH.

In the area in which the image of the object is picked up, the positional relationship of the mask area relative to the binarized object remains unchanged, and thus, the result of the pattern matching shows the mask areas arranged approximately in line with the reference line $L_{k1}$. On the other hand, in the area in which the image of the background or road surface is picked up, the result of the pattern matching varies. Thus, extracting the areas small in displacement amount D allows the areas having the image of the object picked up therein to be extracted as appropriate. The image processing unit 1 then extracts the area containing the binarized object $T_{k1}$ and the extracted mask areas as the object area $R_{k1}$. This ensures accurate extraction of the object area $R_{k1}$. The other operation of the present embodiment is identical to that of the first embodiment.

With the above processing, according to the present embodiment, as in the first embodiment, it is possible to accurately determine the type of the object (living body such as a pedestrian) by appropriately determining the periodicity in movement of the object extracted from the picked-up images of the surroundings of the vehicle. Accordingly, the driver of the vehicle 10 is appropriately provided with information or the like. According to the present embodiment, the processing is possible using only one infrared camera 2, which simplifies the configuration.

While the present embodiment corresponds to the first embodiment provided with one infrared camera 2, any of the second through fifth embodiments may also be modified to have a single infrared camera 2.

Seventh Embodiment

A seventh embodiment of the present invention will now be described. The seventh embodiment differs from the sixth embodiment only in the processing of the object area extracting means 11 and the object end point extracting means 12. In the following, the configuration identical to that of the sixth embodiment will be denoted by the identical reference characters, and description thereof will not be repeated.

In the object type determination apparatus of the present embodiment, for the image areas in the vicinity of the binarized object, the object area extracting means 11 sets a plurality of mask areas in each of two images picked up at different times, and carries out a correlation operation for each pair of mask areas set in the corresponding positions in the two images, to extract the area of the object.

The object end point extracting means 12 then uses the position information of the plurality of mask areas included in the object area extracted by the object area extracting means 11 to extract an end point of the object. The other configuration of the present embodiment is identical to that of the sixth embodiment.

Figure 21:
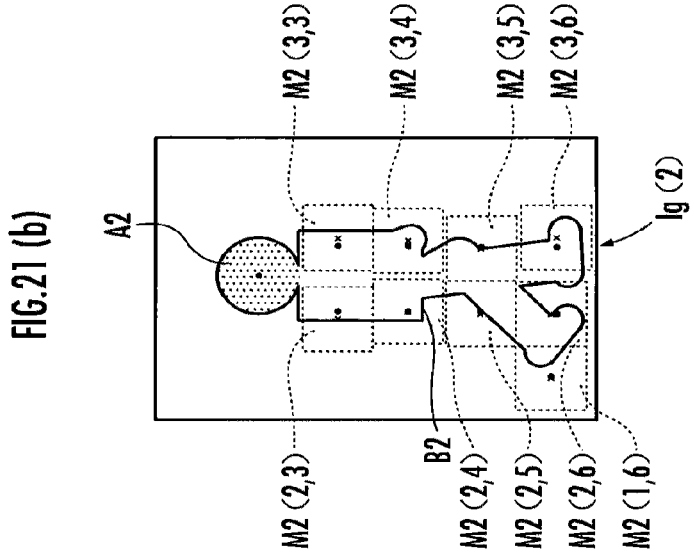
FIG. 21 illustrates the living body determination processing in the object type determination apparatus according to a seventh embodiment of the present invention.
Figure 21:
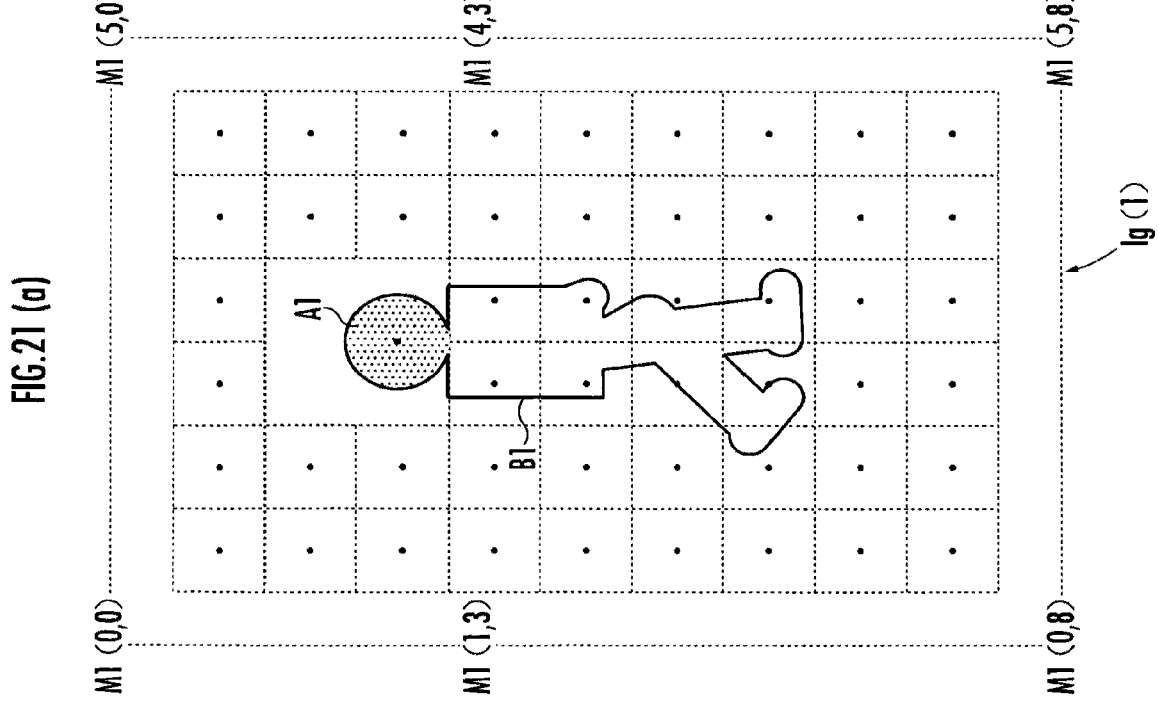

An operation of the object type determination apparatus of the present embodiment will now be described. The operation of the object type determination apparatus of the present embodiment differs from that of the sixth embodiment only in the processing in STEPS 201 and 203 in the living body determination processing in FIG. 6. In the following, the case of extracting the object area in the image Ig(2) using the images Ig(1) and Ig(2) picked up at times k1 and k2, respectively, as shown in FIG. 21 will be described.

In STEP 201 in the present embodiment, the image processing unit 1 extracts a peripheral image area in which a change rate in relative positional relationship with the binarized image between gray scale images Ig(1) and Ig(2) taken at different times is not greater than a predetermined level and in which the degree of correlation of the feature value is not less than a predetermined level, and extracts the area containing the binarized image and the peripheral image area thus extracted, as the object area.

The image processing unit 1 firstly sets mask areas around the binarized image in the gray scale image Ig(2). Specifically, as shown in FIG. 21(*a*), it sets 50 mask areas M1 (M1(0,0), M1(1,0), . . . , M1(5,8)) in the form of a matrix around the binarized image μl. The black point in each mask area indicates the position of the centroid therein.

Next, the image processing unit 1 extracts a peripheral image area from the gray scale image Ig(1). Specifically, for the comparison pattern obtained through affine transformation of the respective mask areas M1(0,0) to M1(5,8) shown in FIG. 21(*a*) at the change rate Rate, it carries out pattern matching (correlation operation) with respect to the gray scale image Ig(2).

FIG. 21(*b*) shows the result of the pattern matching, in which nine peripheral image areas, M2(2,3), M2(3,3), M2(2,4), M2(3,4), M2(2,5), M2(3,5), M2(1,6), M2(2,6), and M2(3,6), including an image B2 corresponding to an image B1 of the body and leg parts of the pedestrian in FIG. 21(*a*) are extracted. For example, M2(2,3) in FIG. 21(*b*) indicates the area extracted from the comparison pattern obtained through affine transformation of M1(2,3) in FIG. 21(*a*), and M2(3,3) in FIG. 21(*b*) is the area extracted from the comparison pattern obtained through affine transformation of M1(3,3) in FIG. 21(*a*).

The black points in FIG. 21(*b*) indicate the positions corresponding to the centroid positions in the respective mask areas M1(2,3), M1(3,3), M1(2,4), M1(3,4), M1(2,5), M1(3,5), M1(1,6), M1(2,6), and M1(3,6) in FIG. 21(*a*) (i.e., the centroid positions of the mask areas M1 reduced in size by the change rate Rate, with respect to the binarized object A2). Further, the x points in FIG. 21(*b*) indicate the positions of the centroids in the respective areas M2 extracted by the pattern matching.

The image processing unit 1 determines whether the displacement amount D of the centroid position (xm(i,j), ym(i,j)) in each area extracted by the pattern matching from the centroid position (xb(i,j), yb(i,j)) of the corresponding mask area is smaller than a threshold value TH, according to the following expression (7), where i,j indicates the index of the mask area.

$$D=\{xb(i,j)-xm(i,j)\}^2+\{yb(i,j)-ym(i,j)\}^2<TH \quad (7)$$

In the expression, D represents the amount of displacement between the centroid position corresponding to the mask area and the centroid position of the area extracted by the pattern matching, and TH represents the threshold value.

The image processing unit 1 then extracts the area having the displacement amount D smaller than the threshold value TH as the peripheral image area. In this manner, in the example shown in FIG. 21(*b*), nine areas containing the image B2 of the body and leg parts of the pedestrian are extracted as the peripheral image areas.

Next, the image processing unit 1 extracts the area containing the binarized object A2 and the peripheral image areas as the object area (the image area of the same object). In the example shown in FIG. 21(*b*), the area containing the binarized object A2 and the peripheral image areas M2(2,3), M2(3,3), M2(2,4), M2(3,4), M2(2,5), M2(3,5), M2(1,6), M2(2,6), and M2(3,6) is extracted as the object area. Thus, by performing the pattern matching for each mask area, the object area can be extracted with accuracy, reflecting the local levels of the correlation degree in the object area.

While the mask areas M1(0,0) to M1(5,8) in FIG. 21(*a*) are set in a matrix in the up, down, left, and right directions of the binarized object A1, if the object is restricted, the mask areas may be set according to the shape of the object to efficiently extract the peripheral image areas.

Next, in STEP 203, the image processing unit 1 sets a leg detecting area in the extracted object area, as in the first embodiment. The image processing unit 1 then extracts, from the leg detecting area, the point of the centroid position in the leftmost mask area and the point of the centroid position in the rightmost mask area as end points. In FIG. 21(*b*), the points corresponding to the positions of centroids in M2(1,6) and M2(3,6) are extracted as the end points of the image portion of the object.

Subsequently, in STEP 204, the image processing unit 1 calculates the width w from the difference in the lateral direction of the extracted two end points. The other operation in the present embodiment is identical to that in the sixth embodiment.

With the above processing, according to the present embodiment, as in the sixth embodiment, it is possible to accurately determine the type of the object (living body such as a pedestrian) by appropriately determining the periodicity in movement of the object extracted from the picked-up images of the surroundings of the vehicle. Accordingly, the driver of the vehicle 10 is appropriately provided with information or the like.

It is noted that the processing of extracting the object area and the end points using the correlation operation in the present embodiment may be applied to the first through fifth embodiments. Specifically, for example in the first through fifth embodiments, the processing of extracting the object area and the end points using the correlation operation as in STEPS 201 and 203 in the present embodiment may be applied only to the processing of extracting the object area in STEP 201 and the processing of extracting the end point in STEP 203 in FIG. 6, with the processing of calculating the distance to the object in STEPS 11 to 14 in FIG. 3 remained unchanged (which uses parallax of the images picked up by the two infrared cameras 2R and 2L).

Eighth Embodiment

Figure 22:
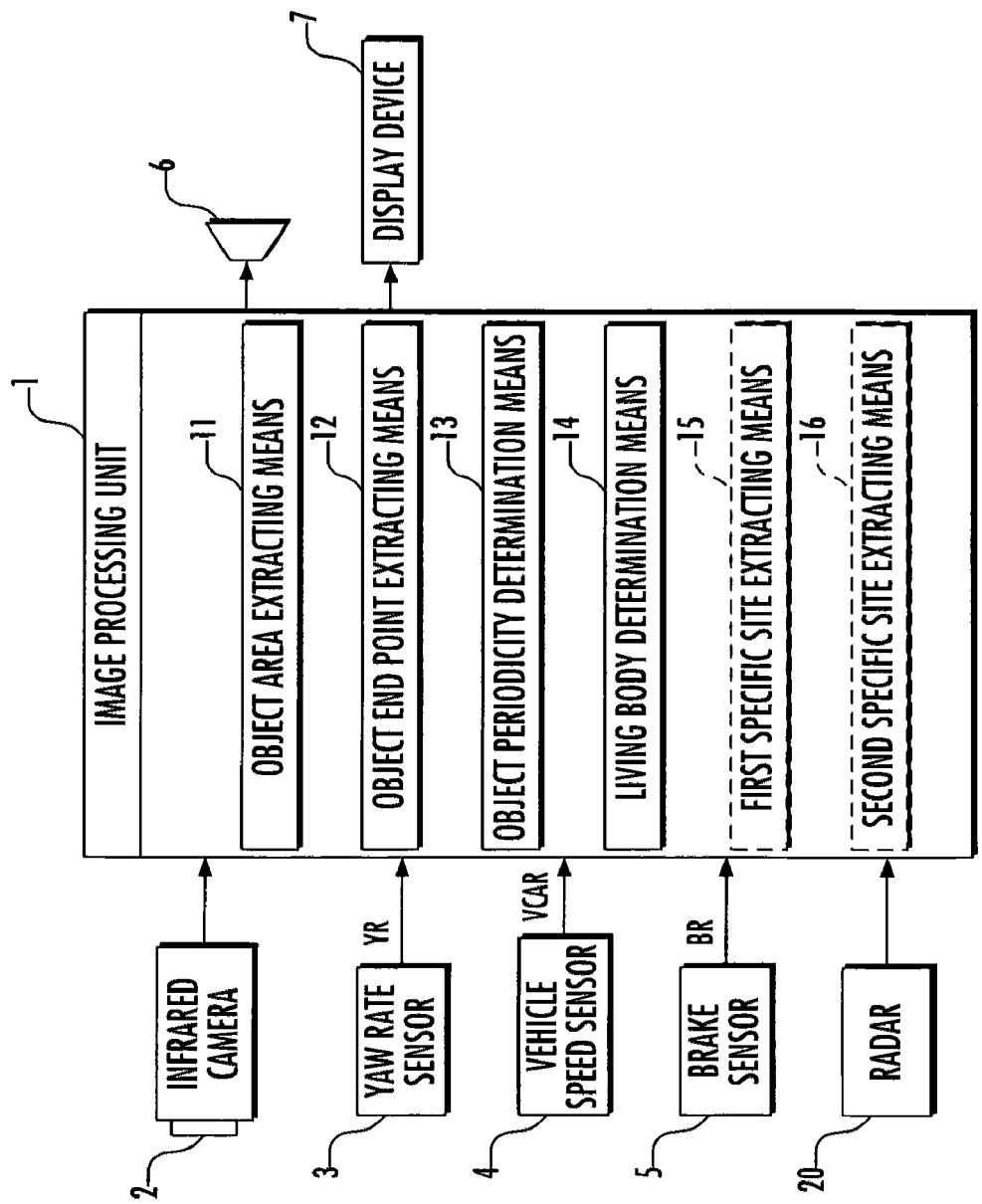
FIG. 22 is a functional block diagram of the object type determination apparatus according to an eighth embodiment of the present invention.

An eighth embodiment of the present invention will now be described with reference to FIG. 22. FIG. 22 is a functional block diagram of the object type determination apparatus of the present embodiment. The present embodiment differs from the first embodiment in that it includes a single infrared camera 2 instead of the two infrared cameras 2R and 2L in the image processing unit 1, and in that it also includes a radar 20 which detects a distance of an object in front of the vehicle 10 with respect to the vehicle 10. In the following, the configuration identical to that of the first embodiment will be denoted by the identical reference characters, and description thereof will not be repeated.

In the present embodiment, the infrared camera 2 is mounted on the front portion of the vehicle 10 to pick up images in front of the vehicle 10. The radar 20, which may be a millimeter wave radar, is also mounted on the front portion of the vehicle 10. The infrared camera 2 corresponds to the image pick-up means of the present invention.

The image processing unit 1 uses the detected result by the radar 20 to calculate distances of the object and the image area to the vehicle 10. Specifically, the image processing unit 1 associates the object extracted from the image picked up by the infrared camera 2 with the object detected by the radar 20, based on the positional relationship between the mounted positions of the infrared camera 2 and the radar 20, the picked-up area by the infrared camera 2, and the detected area by the radar 20. The image processing unit 1 then calculates the distances of the object and the image area to the vehicle 10 from the distance of the object detected by the radar 20. The other configuration of the present embodiment is identical to that of the first embodiment.

An operation of the object type determination apparatus of the present embodiment will now be described. The object detecting and alerting operations of the object type determination apparatus of the present embodiment differ from those of the first embodiment only in the processing of calculating the distance to the object in STEPS 11 to 14 in FIG. 3 and the processing of calculating the distance to the image area in STEP 201 in FIG. 6.

In the present embodiment, the image processing unit 1 calculates the distance z between the vehicle 10 and the object using the detected result by the radar 20, instead of performing STEPS 11 to 14 as described above. Specifically, the image processing unit 1 firstly obtains the result of detection from the radar 20.

Next, the image processing unit 1 associates the detected result by the radar 20 with the object extracted in STEP 7, to calculate the distance z between the vehicle 10 and the object. Then, using the calculated distance z, the image processing unit 1 converts the coordinates (x, y) in the image and the distance z to the real space coordinates, as in the first embodiment, to calculate the real space position which is the position of each object (relative to the vehicle 10) in the real space (STEP 15). In the living body determination processing in FIG. 6, this distance z is used as the distance to the object. Further, in the living body determination processing, the detected result by the radar 20 is used to calculate the distance to the image area, as in the case of the distance to the object. The remaining operation in the present embodiment is identical to that in the first embodiment.

With the above processing, according to the present embodiment, as in the first embodiment, it is possible to accurately determine the type of the object (living body such as a pedestrian) by appropriately determining the periodicity in movement of the object extracted from the picked-up images of the surroundings of the vehicle. Accordingly, the driver of the vehicle 10 is appropriately provided with information or the like.

In the living body determination processing of the present embodiment, the processing of extracting the object area in STEP 201 may be replaced with the processing of extracting the object area using the correlation operation from the images picked up by the single infrared camera 2, as described in the sixth embodiment.

Further, in the living body determination processing in the present embodiment, the processing of extracting the object area in STEP 201 and the processing of extracting the end point of the object in STEP 203 may be replaced with the processing of extracting the object area and the end point using the correlation operation from the images picked up by the single infrared camera 2, as described in the seventh embodiment.

Furthermore, while the present embodiment corresponds to the first embodiment provided with a single infrared camera 2 and the radar 20, the second through fifth embodiments may also be modified to include a signal infrared camera 2 and the radar 20.

Still further, while the infrared cameras are used as the image pick-up means in the first through eighth embodiments, CCD cameras capable of detecting only ordinary visible light, for example, may also be used. Using the infrared cameras, however, can simplify the processing of extracting the pedestrian or the traveling vehicle, and also realize the invention even with a processing device of relatively low computing power.

Furthermore, while the object type determination apparatus is mounted on the vehicle 10 in the first through eighth embodiments, it may be mounted on a movable body other than the vehicle, for example.

What is claimed is:

1. An object type determination apparatus for determining a type of an object the image of which is picked up by an image pick-up means, comprising:
    an object area extracting means for extracting a body area from an image picked up by the image pick-up means;
    an object end point extracting means for extracting an end point of an image portion of the body area;
    an object periodicity determination means for calculating time series data of a feature value indicative of the overall size of the body area using the end point of the image portion of the body area for respective ones of time series images picked up by the image pick-up means, to determine whether the feature value changes with prescribed periodicity; and
    a living body determination means for determining the body area having the feature value which is determined to change with periodicity by the object periodicity determination means as a living body.

2. The object type determination apparatus according to claim 1, wherein the object periodicity determination means uses a width of the image portion of the body area in a lower part area in the body area as the feature value representing the size of the image portion of the body area.

3. The object type determination apparatus according to claim 1, wherein the object periodicity determination means uses a height of the image portion of the body area as the feature value representing the size of the image portion of the body area.

4. The object type determination apparatus according to claim 1, comprising a first specific site extracting means for extracting an image portion of a specific site of the body area, wherein
    the object end point extracting means extracts an end point of the image portion of the specific site extracted by the first specific site extracting means, and
    the object periodicity determination means uses a height of the image portion of the specific site as the feature value representing the size of the image portion of the body area.

5. The object type determination apparatus according to claim 1, comprising a paired-site extracting means for extracting image portions of a pair of specific sites of the body area, wherein
    the object end point extracting means extracts end points of the image portions of the pair of specific sites extracted by the paired-site extracting means, and
    the object periodicity determination means uses a difference in height of the image portions of the pair of specific sites as the feature value representing the size of the body area.

6. The object type determination apparatus according to claim 1, wherein the object periodicity determination means has a plurality of determination conditions for determining whether the feature value representing the size of the image portion of the body area changes with prescribed periodicity based on the time series data of the feature value, and in the case where a result of the determination according to at least a predetermined number of determination conditions among the plurality of determination conditions indicates that the feature value changes with prescribed periodicity, the object periodicity determination means determines that the feature value has prescribed periodicity.

7. The object type determination apparatus according to claim 6, wherein the object periodicity determination means uses, as the determination conditions, at least one of a determination condition having a width of an image portion of the body area in a lower part area in the body area as the feature value, a determination condition having a height of the image portion of the body area as the feature value, a determination condition having a height of an image portion of a specific site of the body area as the feature value, and a determination condition having a difference in height of image portions of a pair of specific sites of the body area as the feature value.

8. The object type determination apparatus according to claim 1, wherein the object end point extracting means extracts an end point of the image portion of the body area by performing edge extracting processing on the body area.

9. The object type determination apparatus according to claim 1, wherein
the object area extracting means sets a plurality of mask areas in each of two images picked up at different times, and performs a correlation operation for a respective pair of the mask areas set in the corresponding positions in the two images to extract the body area, and
the object end point extracting means uses positional information of the plurality of mask areas included in the body area to extract an end point of the image portion of the body area.

10. The object type determination apparatus according to claim 1, wherein the object periodicity determination means uses an upper part area in an area of a first object extracted from one of two images picked up at different times as a template to extract an area of a second object having correlation with the first object from the other one of the two images by template matching to associate the objects in the different times with each other, to thereby calculate the time series data of the feature value representing the size of the image portion of the body area.

11. The object type determination apparatus according to claim 1, wherein
the object periodicity determination means determines whether a maximum change amount of a converted value of the feature value in a real space is within a predetermined range, and
the living body determination means determines an object for which the object periodicity determination means determines that the feature value changes with periodicity and that the maximum change amount of the converted value of the feature value in the real space is within the predetermined range as a living body.

12. The object type determination apparatus according to claim 1, wherein the image pick-up means is an infrared camera.

13. A vehicle having the object type determination apparatus as recited in claim 1 mounted thereon.

14. An object type determination method for determining a type of an object the image of which is picked up by an image pick-up means, comprising:
an object area extracting step of extracting a body area from an image picked up by the image pick-up means;
an object end point extracting step of extracting an end point of an image portion of the body area;
an object periodicity determining step of calculating time series data of a feature value indicative of the overall size of the body area using the end point of the image portion of the body area for respective ones of time series images picked up by the image pick-up means, to determine whether the feature value changes with prescribed periodicity; and
a living body determining step of determining the body area having the feature value which is determined to change with periodicity in the object periodicity determining step as a living body.

15. A system comprising an image pick-up means, a computer processor and a non-transitory computer readable medium having computer instructions for determining a type of an object in an image picked up by the image pick-up means, the computer instructions causing the computer processor to execute:
object area extracting processing of extracting a body area from an image picked up by the image pick-up means;
object end point extracting processing of extracting an end point of the image portion of the body area;
object periodicity determination processing of calculating time series data of a feature value indicative of the overall size of the body area using the end point of the image portion of the body area for respective ones of time series images picked up by the image pick-up means, to determine whether the feature value changes with prescribed periodicity; and
living body determination processing of determining the body area having the feature value which is determined to change with periodicity in the object periodicity determination processing as a living body.

16. An object type determination apparatus for determining a type of an object the image of which is picked up by an image pick-up element, comprising:
an object area extracting element configured to extract a body area from an image picked up by the image pick-up element;
an object end point extracting element configured to extract an end point of an image portion of the body area;
an object periodicity determination element configured to calculate time series data of a feature value indicative of the overall size of the body area using the end point of the image portion of the body area for respective ones of time series images picked up by the image pick-up element, to determine whether the feature value changes with prescribed periodicity; and
a living body determination element configured to determine the body area having the feature value which is determined to change with periodicity by the object periodicity determination element as a living body.

17. An object type determination apparatus for determining a type of an object the image of which is picked up by an image pick-up means, comprising:
an object area extracting means for extracting an area of an object from an image picked up by the image pick-up means;
a paired-site extracting means for extracting image portions of a pair of specific sites of the object from the area of the object extracted by the object area extracting means;
an object end point extracting means for extracting an end point of an image portion of the object from the area of the object extracted by the object area extracting means;
an object periodicity determination means for calculating time series data of a feature value representing a size of the image portion of the object using the end point of the image portion of the object extracted by the object end point extracting means from the area of the object extracted by the object area extracting means for respective ones of time series images picked up by the image pick-up means, to determine whether the feature value changes with prescribed periodicity; and a living body determination means for determining the object having the feature value which is determined to change with periodicity by the object periodicity determination means as a living body, wherein the object end point extracting means extracts end points of the image portions of the pair of specific sites extracted by the paired-site extracting means, and the object periodicity determination means uses a difference in height of the image portions of the pair of specific sites as the feature value representing the size of the object.

18. An object type determination apparatus for determining a type of an object the image of which is picked up by an image pick-up element, comprising:

an object area extracting element configured to extract an area of an object from an image picked up by the image pick-up element;

a paired-site extracting element configured to extract image portions of a pair of specific sites of the object from the area of the object extracted by the object area extracting element;

an object end point extracting element configured to extract an end point of an image portion of the object from the area of the object extracted by the object area extracting element;

an object periodicity determination element configured to calculate time series data of a feature value representing a size of the image portion of the object using the end point of the image portion of the object extracted by the object end point extracting element from the area of the object extracted by the object area extracting element for respective ones of time series images picked up by the image pick-up element, to determine whether the feature value changes with prescribed periodicity; and a living body determination element configured to determine the object having the feature value which is determined to change with periodicity by the object periodicity determination element as a living body, wherein the object end point extracting element extracts end points of the image portions of the pair of specific sites extracted by the paired-site extracting element, and the object periodicity determination element uses a difference in height of the image portions of the pair of specific sites as the feature value representing the size of the object.

* * * * *